US012728650B2

(12) United States Patent
Houjou et al.

(10) Patent No.: US 12,728,650 B2
(45) Date of Patent: Sep. 8, 2026

(54) PRINTING DEVICE AND CONTROL METHOD OF PRINTING DEVICE

(71) Applicant: FUJIFILM Corporation, Tokyo (JP)

(72) Inventors: Hiroaki Houjou, Kanagawa (JP); Yuji Asano, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 56 days.

(21) Appl. No.: 18/792,485

(22) Filed: Aug. 1, 2024

(65) Prior Publication Data

US 2024/0391254 A1 Nov. 28, 2024

Related U.S. Application Data

(63) Continuation of application No. PCT/JP2022/046632, filed on Dec. 19, 2022.

(30) Foreign Application Priority Data

Feb. 15, 2022 (JP) ................................ 2022-021363

(51) Int. Cl.
*B41J 11/00* (2006.01)
*B41J 15/16* (2006.01)

(52) U.S. Cl.
CPC ......... *B41J 11/0015* (2013.01); *B41J 15/165* (2013.01)

(58) Field of Classification Search
CPC ............................ B41J 11/0015; B41J 15/165
See application file for complete search history.

(56) References Cited

U.S. PATENT DOCUMENTS

| | | | | |
|---|---|---|---|---|
| 2009/0047419 | A1* | 2/2009 | Miura | B41J 2/162 427/10 |
| 2016/0121624 | A1 | 5/2016 | Yamada et al. | |
| 2020/0398600 | A1* | 12/2020 | Takeuchi | B41J 2/2107 |

(Continued)

FOREIGN PATENT DOCUMENTS

| | | | |
|---|---|---|---|
| JP | 2014159130 | | 9/2014 |
| JP | 2014159130 | A * | 9/2014 |
| JP | 2016087925 | | 5/2016 |

(Continued)

OTHER PUBLICATIONS

"Search Report of Europe Counterpart Application", issued on May 23, 2025, pp. 1-9.

(Continued)

*Primary Examiner* — Jason S Uhlenhake
(74) *Attorney, Agent, or Firm* — JCIPRNET

(57) ABSTRACT

Provided are a printing device and a control method of a printing device that prevent accumulation of dirt on a drying device caused by a pretreatment liquid. In a printing device including an ink applying device that applies an ink to a printing surface of a long transported substrate, a pretreatment liquid applying device that applies a pretreatment liquid to the printing surface, and a first drying device that has a pass roller coming into contact with the printing surface and that dries the ink, transport of the substrate is stopped once an end part that is an end of a region of the printing surface of the substrate, to which the pretreatment liquid is applied, reaches between the first drying device and a winding device, in a case of stopping the transport of the substrate.

14 Claims, 14 Drawing Sheets

(56) References Cited

U.S. PATENT DOCUMENTS

| | | | |
|---|---|---|---|
| 2020/0406656 | A1 | 12/2020 | Markies et al. |
| 2021/0054223 | A1 | 2/2021 | Fujii et al. |

FOREIGN PATENT DOCUMENTS

| | | | | |
|---|---|---|---|---|
| JP | 2016112727 | | | 6/2016 |
| JP | 6464680 | | | 2/2019 |
| JP | 2021041549 | | | 3/2021 |
| JP | 2021041549 | A | * | 3/2021 |
| WO | 2017069074 | | | 4/2017 |
| WO | 2019235141 | | | 12/2019 |

OTHER PUBLICATIONS

"International Search Report (Form PCT/ISA/210) of PCT/JP2022/046632", mailed on Feb. 28, 2023, with English translation thereof, pp. 1-7.

"Written Opinion of the International Searching Authority (Form PCT/ISA/237) of PCT/ JP2022/046632", mailed on Feb. 28, 2023, with English translation thereof, pp. 1-8.

"Notice of Reasons for Refusal of Japan Counterpart Application", issued on Jun. 24, 2026, with English translation thereof, p. 1-p. 6.

* cited by examiner

FIG. 8

| MATERIAL | CONTENT [wt%] |
| --- | --- |
| POLYOLEFIN RESIN PARTICLES AUROREN AE-301 | 5 TO 10 |
| CALCIUM ACETATE | 5 TO 10 |
| 2-PROPANOL | 5 |
| SURFACTANT | 1 TO 4 |
| WATER | REMAINDER |

FIG. 9

| MATERIAL | CONTENT [wt%] |
| --- | --- |
| CALCIUM ACETATE | 2 |
| ACRYLIC EMULSION | 2 |
| CHLORINATED POLYOLEFIN EMULSION | 2 |
| SURFACTANT | 0.5 |
| WATER | REMAINDER |

FIG. 12

| EXPERIMENT NO. | PRINTING CONDITIONS | | | | | | | | | | | | | EVALUATION | | | | | | |
|---|---|---|---|---|---|---|---|---|---|---|---|---|---|---|---|---|---|---|---|---|
| | COATING | | | | COATING DRYING | | INK DRYING | | | | | | | | | DIRT ON PASS ROLLERS | | | | |
| | COATING AMOUNT | RESIN Tg | SOLVENT AMOUNT | TENSION OF SUBSTRATE DURING COATING | SUBSTRATE TEMPERATURE DURING DRYING | REMAINING WATER AMOUNT AFTER DRYING | FIRST DRYING FURNACE PRINTING TEMPERATURE | FIRST DRYING FURNACE STANDBY TEMPERATURE | SECOND DRYING FURNACE PRINTING TEMPERATURE | SECOND DRYING FURNACE STANDBY TEMPERATURE | TENSION OF SUBSTRATE DURING DRYING | REMAINING SOLVENT AMOUNT AFTER DRYING | STOP POSITION OF COATING END | WASTE LENGTH | PRINTING STANDBY TIME | FIRST DRYING FURNACE | SECOND DRYING FURNACE | IMAGE ADHESIVENESS | CLEANING FREQUENCY OF COATING ROLLER | OVERALL DETERMINATION |
| | gsm | °C | % | N/m | °C | gsm | °C | °C | °C | °C | N/m | gsm | | | | | | | | |
| 1 | | 45 | | | | | | | | | | | IN FIRST DRYING FURNACE | AA | A | D | D | A | B | D |
| 2 | | 45 | | | | | | | | | | | IN SECOND DRYING FURNACE | A | A | A | D | A | B | D |
| 3 | | 45 | | | | | | | | | | | OUTSIDE SECOND DRYING FURNACE | B | A | A | A | A | B | A |
| 4 | | 65 | | | | | | | | | | | IN FIRST DRYING FURNACE | AA | A | D | D | A | B | D |
| 5 | 3 | 65 | 0 | 70 | 80 | 0.003 | 80 | 80 | 80 | 80 | 70 | 0 | IN SECOND DRYING FURNACE | A | A | A | D | A | B | D |
| 6 | | 65 | | | | | | | | | | | OUTSIDE SECOND DRYING FURNACE | B | A | A | A | A | B | A |
| 7 | | 85 | | | | | | | | | | | IN FIRST DRYING FURNACE | AA | A | A | A | B | A | A |
| 8 | | 85 | | | | | | | | | | | IN SECOND DRYING FURNACE | A | A | A | A | B | A | A |
| 9 | | 85 | | | | | | | | | | | OUTSIDE SECOND DRYING FURNACE | B | A | A | A | B | A | A |
| 10 | | 45 | | | | | | | | | | | IN FIRST DRYING FURNACE | AA | A | D | C | A | B | D |
| 11 | | 45 | | | | | | | | | | | IN SECOND DRYING FURNACE | A | A | A | C | A | B | A |
| 12 | | 45 | | | | | | | | | | | OUTSIDE SECOND DRYING FURNACE | B | A | A | A | A | B | A |
| 13 | | 65 | | | | | | | | | | | IN FIRST DRYING FURNACE | AA | A | D | B | B | B | D |
| 14 | 3 | 65 | 0 | 70 | 80 | 0.003 | 80 | 80 | 60 | 60 | 70 | 0 | IN SECOND DRYING FURNACE | A | A | A | B | B | B | A |
| 15 | | 65 | | | | | | | | | | | OUTSIDE SECOND DRYING FURNACE | B | A | A | A | B | B | A |
| 16 | | 85 | | | | | | | | | | | IN FIRST DRYING FURNACE | AA | A | A | A | C | A | C |
| 17 | | 85 | | | | | | | | | | | IN SECOND DRYING FURNACE | A | A | A | A | C | A | C |
| 18 | | 85 | | | | | | | | | | | OUTSIDE SECOND DRYING FURNACE | B | A | A | A | C | A | C |
| 19 | | 45 | | | | | | | | | | | IN FIRST DRYING FURNACE | AA | B | D | C | A | B | D |
| 20 | | 45 | | | | | | | | | | | IN SECOND DRYING FURNACE | A | B | A | C | A | B | C |
| 21 | | 45 | | | | | | | | | | | OUTSIDE SECOND DRYING FURNACE | B | B | A | A | A | B | A |
| 22 | | 65 | | | | | | | | | | | IN FIRST DRYING FURNACE | AA | B | B | B | A | B | A |
| 23 | 3 | 65 | 0 | 70 | 80 | 0.003 | 80 | 60 | 80 | 60 | 70 | 0 | IN SECOND DRYING FURNACE | A | B | A | B | A | B | A |
| 24 | | 65 | | | | | | | | | | | OUTSIDE SECOND DRYING FURNACE | B | B | A | A | A | B | A |
| 25 | | 85 | | | | | | | | | | | IN FIRST DRYING FURNACE | AA | B | A | A | B | A | A |
| 26 | | 85 | | | | | | | | | | | IN SECOND DRYING FURNACE | A | B | A | A | B | A | A |
| 27 | | 85 | | | | | | | | | | | OUTSIDE SECOND DRYING FURNACE | B | B | A | A | B | A | A |
| 28 | | | | | | | | | | | | | IN FIRST DRYING FURNACE | AA | A | E | E | B | A | D |
| 29 | | | 1 | | | | | | | | | 0.1 | IN SECOND DRYING FURNACE | A | A | B | E | B | A | D |
| 30 | | | | | | | | | | | | | OUTSIDE SECOND DRYING FURNACE | B | A | B | B | B | A | A |
| 31 | | | | | | | | | | | | | IN FIRST DRYING FURNACE | AA | A | E | E | C | A | D |
| 32 | 3 | 45 | 3 | 70 | 80 | 0.003 | 80 | 80 | 80 | 80 | 70 | 0.3 | IN SECOND DRYING FURNACE | A | A | B | E | C | A | D |
| 33 | | | | | | | | | | | | | OUTSIDE SECOND DRYING FURNACE | B | A | B | B | C | A | C |
| 34 | | | | | | | | | | | | | IN FIRST DRYING FURNACE | AA | A | E | E | C | A | D |
| 35 | | | 5 | | | | | | | | | 0.5 | IN SECOND DRYING FURNACE | A | A | C | E | C | A | D |
| 36 | | | | | | | | | | | | | OUTSIDE SECOND DRYING FURNACE | B | A | C | C | C | A | C |

FIG. 13

| EXPERIMENT NO. | PRINTING CONDITIONS: COATING: COATING AMOUNT | PRINTING CONDITIONS: COATING: RESIN Tg | PRINTING CONDITIONS: COATING: SOLVENT AMOUNT | PRINTING CONDITIONS: COATING: TENSION OF SUBSTRATE DURING COATING | PRINTING CONDITIONS: COATING DRYING: SUBSTRATE TEMPERATURE DURING DRYING | PRINTING CONDITIONS: COATING DRYING: REMAINING WATER AMOUNT AFTER DRYING | PRINTING CONDITIONS: INK DRYING: FIRST DRYING FURNACE: PRINTING TEMPERATURE | PRINTING CONDITIONS: INK DRYING: FIRST DRYING FURNACE: STANDBY TEMPERATURE | PRINTING CONDITIONS: INK DRYING: SECOND DRYING FURNACE: PRINTING TEMPERATURE | PRINTING CONDITIONS: INK DRYING: SECOND DRYING FURNACE: STANDBY TEMPERATURE | PRINTING CONDITIONS: INK DRYING: TENSION OF SUBSTRATE DURING DRYING | PRINTING CONDITIONS: INK DRYING: REMAINING SOLVENT AMOUNT AFTER DRYING | STOP POSITION OF COATING END | EVALUATION: WASTE LENGTH | EVALUATION: PRINTING STANDBY TIME | EVALUATION: DIRT ON PASS ROLLERS: FIRST DRYING FURNACE | EVALUATION: DIRT ON PASS ROLLERS: SECOND DRYING FURNACE | EVALUATION: IMAGE ADHESIVENESS | EVALUATION: CLEANING FREQUENCY OF COATING ROLLER | EVALUATION: OVERALL DETERMINATION |
|---|---|---|---|---|---|---|---|---|---|---|---|---|---|---|---|---|---|---|---|---|
| | gsm | °C | % | N/m | °C | gsm | °C | °C | °C | °C | N/m | gsm | | | | | | | | |
| 37 | 3 | 45 | 0 | 10 | 80 | 0.003 | 80 | 80 | 80 | 80 | 70 | 0 | OUTSIDE SECOND DRYING FURNACE | B | A | D | D | A | B | D |
| 38 | | | | 20 | | | | | | | | | | B | A | C | C | A | B | C |
| 39 | | | | 40 | | | | | | | | | | B | A | A | A | A | B | A |
| 40 | | | | 150 | | | | | | | | | | B | A | A | A | A | B | A |
| 41 | | | | 200 | | | | | | | | | | B | A | A | A | A | B | A |
| 42 | | | | 300 | | | | | | | | | | D | A | A | A | A | B | D |
| 43 | 3 | 45 | 0 | 70 | 80 | 0.003 | 80 | 80 | 80 | 80 | 10 | 0 | OUTSIDE SECOND DRYING FURNACE | D | A | A | A | A | B | D |
| 44 | | | | | | | | | | | 20 | | | B | A | A | A | A | B | A |
| 45 | | | | | | | | | | | 50 | | | B | A | A | A | A | B | A |
| 46 | | | | | | | | | | | 100 | | | B | A | A | A | A | B | A |
| 47 | | | | | | | | | | | 150 | | | B | A | C | C | A | B | C |
| 48 | | | | | | | | | | | 200 | | | B | A | D | D | A | B | D |
| 49 | 0.1 | 45 | 0 | 70 | 80 | 0.003 | 80 | 80 | 80 | 80 | 70 | 0 | OUTSIDE SECOND DRYING FURNACE | B | A | A | A | D | B | D |
| 50 | 0.5 | | | | | | | | | | | | | B | A | A | A | B | B | A |
| 51 | 1 | | | | | | | | | | | | | B | A | A | A | A | B | A |
| 52 | 5 | | | | | | | | | | | | | B | A | A | A | A | B | A |
| 53 | 8 | | | | | | | | | | | | | B | A | B | B | B | B | A |
| 54 | 10 | | | | | | | | | | | | | B | A | C | C | C | B | C |
| 55 | 12 | | | | | | | | | | | | | B | A | D | D | D | B | D |
| 56 | 3 | 45 | 0 | 70 | 25 | 0.003 | 80 | 80 | 80 | 80 | 70 | 0 | OUTSIDE SECOND DRYING FURNACE | B | A | D | D | D | B | D |
| 57 | | | | | 30 | | | | | | | | | B | A | C | C | C | B | C |
| 58 | | | | | 40 | | | | | | | | | B | A | B | B | B | B | A |
| 59 | | | | | 60 | | | | | | | | | B | A | A | A | A | B | A |
| 60 | | | | | 90 | | | | | | | | | C | A | A | A | A | B | C |
| 61 | | | | | 100 | | | | | | | | | D | A | A | A | A | B | D |
| 62 | 3 | 45 | 0 | 70 | 80 | 0.005 | 80 | 80 | 80 | 80 | 70 | 0 | OUTSIDE SECOND DRYING FURNACE | B | A | A | A | A | B | A |
| 63 | | | | | | 0.01 | | | | | | | | B | A | A | A | A | B | A |
| 64 | | | | | | 0.05 | | | | | | | | B | A | B | B | B | B | A |
| 65 | | | | | | 0.1 | | | | | | | | B | A | C | C | C | B | C |
| 66 | | | | | | 0.12 | | | | | | | | B | A | D | D | D | B | D |
| 14 | 3 | 65 | 0 | 70 | 80 | 0.003 | 80 | 80 | 60 | 60 | 70 | 0 | IN SECOND DRYING FURNACE | A | A | A | B | B | B | A |
| 67 | | | 3 | | | | | | | | | 0.2 | IN SECOND DRYING FURNACE | A | A | B | B | B | A | A |
| 68 | | | | | | | | | | | | 0.5 | IN SECOND DRYING FURNACE | A | A | C | C | C | A | C |
| 69 | | | | | | | | | | | | 0.7 | IN SECOND DRYING FURNACE | A | A | D | D | D | A | D |

PRINTING DEVICE AND CONTROL METHOD OF PRINTING DEVICE

CROSS-REFERENCE TO RELATED APPLICATIONS

The present application is a Continuation of PCT International Application No. PCT/JP2022/046632 filed on Dec. 19, 2022 claiming priority under 35 U.S.C § 119 (a) to Japanese Patent Application No. 2022-021363 filed on Feb. 15, 2022. Each of the above applications is hereby expressly incorporated by reference, in its entirety, into the present application.

BACKGROUND OF THE INVENTION

1. Field of the Invention

The present invention relates to a printing device and a control method of a printing device and particularly relates to a technique of coating a long substrate with a pretreatment liquid.

2. Description of the Related Art

In the field of commercial printing and the field of soft packaging, devices that perform printing on a roll-shaped substrate such as paper and a film are widely used. In drying an ink, particularly an aqueous ink printed on the roll-shaped substrate, a drying furnace having a long path length is required in order to secure a drying time.

In a case where an image having a large amount of high-concentration ink is printed and the ink is not sufficiently dried, the ink is transferred to a pass roller while a printing surface of the substrate comes into contact with the pass roller in the drying furnace. In a case where the ink transferred to the pass roller is bonded to the substrate, hindrance to transport of the substrate is caused, and a transport trouble such as creases and breakage is caused. In order to prevent this, JP6464680B discloses that, in a case where the transport of the substrate is stopped, the transport is stopped after a printed image formed on the substrate passes through a heating region.

SUMMARY OF THE INVENTION

In order to closely attach the ink to the substrate, pretreatment is performed on the substrate through a method of coating with an anchor agent (pretreatment liquid) in some cases. In many cases, the anchor agent contains a resin component and imparts film-forming properties. For such a reason, in a case where a region of the substrate, which is coated with the anchor agent, is stopped in the drying furnace, there is a concern that the anchor agent is fusion welded and transferred to the pass roller due to a high temperature in the furnace, and the pass roller becomes dirty. Since the anchor agent adhering to the surface of the pass roller has adhesiveness, the anchor agent has the same or stronger adhesive force than the ink. For this reason, in a case where the anchor agent transferred to the pass roller is bonded to the substrate, hindrance to the transport is caused, and a transport trouble such as creases and breakage is caused.

The present invention has been devised in view of such circumstances, and an object thereof is to provide a printing device and a control method of a printing device that prevent accumulation of dirt on a drying device caused by a pretreatment liquid.

According to an aspect, in order to achieve the object, there is provided a printing device comprising a transport device that transports a long substrate along a transport path and that winds the substrate with a winding device, an ink applying device that is disposed in the transport path and that applies an ink to a printing surface of the substrate, a pretreatment liquid applying device that is disposed on an upstream side of the ink applying device in the transport path and that applies a pretreatment liquid to the printing surface of the substrate, a first drying device that is disposed on a downstream side of the ink applying device in the transport path and that dries the ink applied to the printing surface of the substrate, and at least one processor, in which the processor is configured to stop transport of the substrate once an end part that is an end of a region of the printing surface of the substrate, to which the pretreatment liquid is applied, reaches between the first drying device and the winding device, in a case of stopping the transport of the substrate. According to the present aspect, since the transport of the substrate is stopped once the region of the printing surface of the substrate, to which the pretreatment liquid is applied, is completely discharged from the first drying device, accumulation of dirt on the first drying device caused by the pretreatment liquid can be prevented.

It is preferable that the first drying device includes a pass roller that comes into contact with the printing surface of the substrate. Accordingly, a path length required for drying can be secured, and the pretreatment liquid can be prevented from being transferred to the pass roller after the transport of the substrate is stopped.

It is preferable that a second drying device that is disposed on the downstream side of the first drying device in the transport path is further comprised, and the processor is configured to set the first drying device to a first temperature and set the second drying device to a second temperature lower than the first temperature. Accordingly, both reduction of the waste length of the substrate and prevention of accumulation of dirt on the drying device can be achieved.

It is preferable that the pretreatment liquid contains a resin of which a softening temperature is Ts, and the Ts satisfies a relationship of the first temperature>the Ts>the second temperature. Accordingly, accumulation of dirt on the second drying device caused by the pretreatment liquid can be prevented even in a case where the transport of the substrate is stopped in a state where a pretreatment liquid application region remains in the second drying device.

It is preferable that the pretreatment liquid contains a resin of which a softening temperature is Ts, the processor is configured to set the first drying device to a first temperature in a printing mode in which the substrate is transported and set the first drying device to a third temperature in a printing standby mode in which the transport of the substrate is stopped, and the Ts satisfies a relationship of the first temperature>the Ts>the third temperature. Accordingly, even in a case where the pretreatment liquid application region remains in the first drying device, accumulation of dirt on the first drying device caused by the pretreatment liquid can be prevented. Therefore, it is not necessary to stop the transport of the substrate once an end part of the pretreatment liquid application region reaches between the first drying device and the winding device, and the waste length of the substrate can be reduced.

It is preferable that the processor is configured to cause the first drying device to transition to the printing standby mode after printing ends and stop the first drying device after a certain time has elapsed from the transition to the printing standby mode. Accordingly, the first drying device can be cooled after a certain time has elapsed, and accumulation of dirt on the first drying device, which is caused by the first drying device being heated for a long time, can be prevented.

It is preferable that the pretreatment liquid contains an organic solvent, and a content of the organic solvent is less than 5 percent by mass with respect to a total mass of the pretreatment liquid. As the content of the organic solvent decreases, the first drying device can be prevented from being dirty due to the pretreatment liquid.

It is preferable that the first drying device performs drying until an organic solvent remaining amount of a surface of the substrate becomes 0.5 gsm or less. In addition, it is more preferable that the first drying device performs drying until the organic solvent remaining amount of the surface of the substrate becomes 0.2 gsm or less. Accordingly, the first drying device can be prevented from being dirty due to insufficient drying.

It is preferable that the pretreatment liquid does not contain an organic solvent. Accordingly, accumulation of dirt on the first drying device caused by the pretreatment liquid can be prevented, and adhesiveness can be secured. The pretreatment liquid may not substantially contain the organic solvent, and cleanability of the first drying device can be improved by adding a trace amount of the organic solvent.

It is preferable that the pretreatment liquid applying device applies 0.5 gsm or more and 10 gsm or less of the pretreatment liquid to the substrate. In addition, it is more preferable that the pretreatment liquid applying device applies 0.5 gsm or more and 8 gsm or less of the pretreatment liquid to the substrate. Accordingly, accumulation of dirt on the first drying device caused by the pretreatment liquid can be prevented, and adhesiveness can be secured.

It is preferable that the pretreatment liquid applying device includes a pretreatment liquid drying device that dries the pretreatment liquid applied to the substrate, and the pretreatment liquid drying device performs drying until a remaining water amount of a surface of the substrate becomes 0.1 gsm or less. In addition, it is more preferable that the pretreatment liquid drying device performs drying until the remaining water amount of the surface of the substrate becomes 0.05 gsm or less. Accordingly, the first drying device can be prevented from being dirty due to insufficient drying.

It is preferable that the pretreatment liquid applying device further includes a pretreatment liquid drying device that dries the pretreatment liquid applied to the substrate, and the pretreatment liquid drying device makes a temperature of the substrate 30° C. or more and 90° C. or less. In addition, it is more preferable that the pretreatment liquid drying device makes the temperature of the substrate 40° C. or more and 60° C. or less. Accordingly, insufficient drying can be prevented and deformation of the substrate can be prevented.

It is preferable that the transport device transports the substrate by applying tension of 20 newtons or more and 200 newtons or less per meter to the substrate in a case of applying the pretreatment liquid. It is more preferable that the transport device transports the substrate by applying tension of 40 newtons or more and 200 newtons or less per meter to the substrate in a case of applying the pretreatment liquid. Accordingly, dirt on the first drying device caused by insufficient drying can be prevented, and an increase in the waste length can be prevented.

It is preferable that the transport device transports the substrate by applying tension of 20 newtons or more and 150 newtons or less per meter to the substrate in a case of drying the ink. It is more preferable that the transport device transports the substrate by applying tension of 20 newtons or more and 100 newtons or less per meter to the substrate in a case of drying the ink. Accordingly, the transport can be stabilized, and the first drying device can be prevented from being dirty.

It is preferable that an imaging device that is disposed between the first drying device and the winding device in the transport path and that images the printing surface of the substrate is further comprised, and the processor is configured to detect that the end part has reached between the first drying device and the winding device from an image of the printing surface, which is captured by the imaging device. Accordingly, it is possible to appropriately detect that the end part has reached between the first drying device and the winding device.

According to another aspect, in order to achieve the object, there is provided a control method of a printing device including a transport device that transports a long substrate along a transport path and that winds the substrate with a winding device, an ink applying device that is disposed in the transport path and that applies an ink to a printing surface of the substrate, a pretreatment liquid applying device that is disposed on an upstream side of the ink applying device in the transport path and that applies a pretreatment liquid to the printing surface of the substrate, and a first drying device that is disposed on a downstream side of the ink applying device in the transport path, that has a pass roller coming into contact with the printing surface of the substrate, and that dries the ink applied to the printing surface of the substrate, the control method comprising stopping transport of the substrate once an end part that is an end of a region of the printing surface of the substrate, to which the pretreatment liquid is applied, reaches between the first drying device and the winding device, in a case of stopping the transport of the substrate. According to the present aspect, since the transport of the substrate is stopped once the region of the printing surface of the substrate, to which the pretreatment liquid is applied, is completely discharged from the first drying device, accumulation of dirt on the first drying device caused by the pretreatment liquid can be prevented.

According to still another aspect, in order to achieve the object, there is provided a printing device comprising a transport device that transports a long substrate along a transport path and that winds the substrate with a winding device, an ink applying device that is disposed in the transport path and that applies an ink to a printing surface of the substrate, a pretreatment liquid applying device that is disposed on an upstream side of the ink applying device in the transport path and that applies a pretreatment liquid to the printing surface of the substrate, a first drying device that is disposed on a downstream side of the ink applying device in the transport path and that dries the ink applied to the printing surface of the substrate, and at least one processor, in which the processor is configured to stop transport of the substrate once an end part that is an end of a region of the printing surface of the substrate, to which the pretreatment liquid is applied, reaches between the first drying device and the winding device, in a case of stopping the transport of the substrate, the pretreatment liquid contains a resin of which a softening temperature is Ts, the processor is configured to set the first drying device to a first temperature in a printing mode in which the substrate is transported and set the first drying device to a third temperature in a printing standby mode in which the transport of the substrate is stopped, and the Ts satisfies a relationship of the first temperature>the Ts>the third temperature. According to the present aspect, even in a case where the pretreatment liquid application region remains in the first drying device, accumulation of dirt on the first drying device caused by the pretreatment liquid can be prevented. Therefore, it is not necessary to stop the transport of the substrate once the end part of the pretreatment liquid application region reaches between the first drying device and the winding device, and the waste length of the substrate can be reduced.

According to the present invention, accumulation of dirt on the drying device caused by the pretreatment liquid can be prevented.

BRIEF DESCRIPTION OF THE DRAWINGS

FIG. 8 is a table showing a composition example of a pretreatment liquid according to another specific example.

FIG. 9 is a table showing a composition example of a pretreatment liquid according to still another specific example.

FIG. 12 is a table showing printing conditions of experimental examples and evaluation results of each item.

FIG. 13 is a table showing printing conditions of experimental examples and evaluation results of each item.

DESCRIPTION OF THE PREFERRED EMBODIMENTS

Hereinafter, a preferable embodiment of the present invention will be described in detail with reference to the accompanying drawings.

As described above, it is necessary to prevent accumulation of dirt on the drying device caused by a pretreatment liquid. As the dirt on the drying device, for example, there is pass roller transfer dirt in a drying furnace.

Depending on a coating method of a pretreatment liquid, a liquid pool (bead) formed between a coating roller for applying the pretreatment liquid and a substrate remains as it is at the end of coating, and a coating end part is thickly coated. For this reason, it is necessary to eliminate the liquid pool and to resolve the thick coating in some cases by stopping the coating roller at the end of printing to transport only the substrate and transferring a liquid in the liquid pool to the substrate.

In this case, even in a case where an interval from a printing end position to a coating end position is long, and a printing region is discharged from the drying furnace, it is necessary to further discharge a coating region as well. Thus, there is a problem that a waste length of the substrate increases.

In this manner, it is an object to achieve a balance between prevention of pass roller transfer dirt in the drying furnace and prevention of an increase in the waste length of the substrate. Hereinafter, a printing device and a control method thereof that prevent the accumulation of dirt on the drying device caused by a pretreatment liquid and that prevent an increase in the waste length of the substrate will be disclosed.

<Printing Device>

[Configuration of Ink Jet Printing Device]

Figure 1:
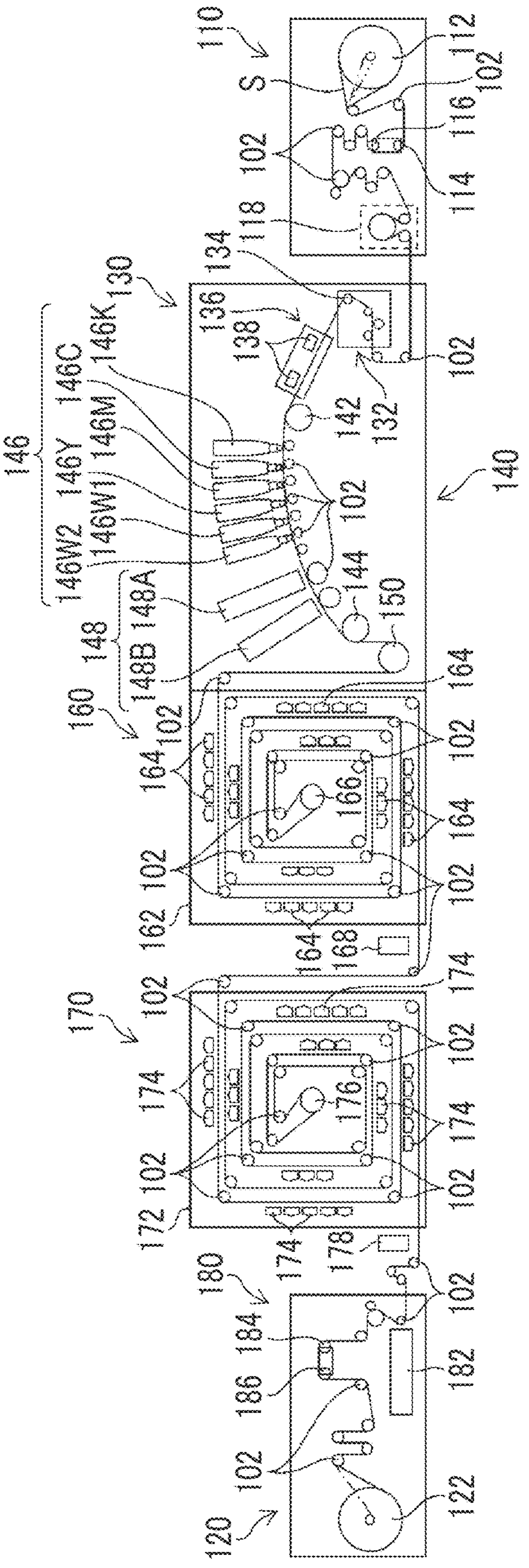
FIG. 1 is an overall configuration view of an ink jet printing device.

FIG. 1 is an overall configuration view of an ink jet printing device 10. The ink jet printing device 10 is a printing device that prints an image on a web-shaped substrate S (an example of a "long substrate"), which is an impermeable medium, through a single-pass method. The substrate S is, for example, a transparent film substrate used in soft packaging. The film substrate is, for example, polyethylene terephthalate (PET), oriented polypropylene (OPP), and nylon (NY). The ink jet printing device 10 manufactures a reverse-printed printed material of which a printing target is visible from a surface opposite to a back surface of a printing surface with respect to a substrate S.

The term "impermeability" means that a pretreatment liquid and an aqueous ink to be described later are impermeable. The term "soft packaging" means packaging formed of a material that deforms depending on a shape of an article to be packaged. The term "transparent" means that a light transmittance of visible light is 30% or more and 100% or less and preferably 70% or more and 100% or less.

The substrate printed by the ink jet printing device 10 is not limited to a film and may be coated paper or the like.

As shown in FIG. 1, the ink jet printing device 10 comprises a transport unit 100, a sending unit 110, a winding unit 120, a pretreatment unit 130, a printing unit 140, a first drying unit 160, a second drying unit 170, and an examination unit 180.

[Transport Unit]

The transport unit 100 (an example of a "transport device") transports the substrate S to the pretreatment unit 130, the printing unit 140, the first drying unit 160, the second drying unit 170, and the examination unit 180 in this order along a transport path from the sending unit 110 to the winding unit 120.

The sending unit 110 comprises a sending roll 112. The sending roll 112 comprises a reel (not shown) that is rotatably supported. The substrate S before an image is printed is wound around the reel in a roll shape. The winding unit 120 comprises a winding roll 122. The winding roll 122 comprises a reel (not shown) that is rotatably supported. One end of the substrate S is connected to the reel. The winding roll 122 comprises a motor (not shown) that rotationally drives the reel.

The transport unit 100 comprises a plurality of pass rollers 102 that function as guide rollers. The transport unit 100 rotationally drives a first drive roller 114, a second drive roller 116, a third drive roller 134, a first suction drum 142, a second suction drum 144, a first folding-back roller 166, a second folding-back roller 176, a fourth drive roller 184, and the winding roll 122, each of which comprises a motor (not shown), to send the substrate S from the sending roll 112 of the sending unit 110 and to wind the printed substrate S around the winding roll 122 of the winding unit 120.

As described above, the substrate S is transported by the transport unit 100 along the transport path from the sending roll 112 to the winding roll 122 through a roll-to-roll method.

[Sending Unit]

The sending unit 110 comprises the sending roll 112, the first drive roller 114, the second drive roller 116, and a corona treatment unit 118.

The plurality of pass rollers 102 are disposed in the transport path of the sending unit 110. The substrate S wound around the sending roll 112 is guided by the pass rollers 102 and is transported to the first drive roller 114.

The first drive roller 114 is rotated by the motor (not shown), comes into contact with the substrate S, and transports the substrate S. The substrate S transported by the first drive roller 114 is transported to the second drive roller 116. The second drive roller 116 is rotated by the motor (not shown), comes into contact with the substrate S, and transports the substrate S.

The substrate S transported by the second drive roller 116 is guided by the pass rollers 102 and is transported to a position facing the corona treatment unit 118. The corona treatment unit 118 performs a corona discharge treatment on the printing surface of the substrate S to improve adhesiveness between the printing surface having water repellency, and a pretreatment liquid and an aqueous ink.

The substrate S having the printing surface reformed by the corona treatment unit 118 is transported from the sending unit 110 to the pretreatment unit 130.

[Pretreatment Unit]

The pretreatment unit 130 (an example of a "pretreatment liquid applying device") is disposed on an upstream side of the printing unit 140 in the transport path. The pretreatment unit 130 coats (an example of "applying") the printing surface of the substrate S with a pretreatment liquid and dries the coating pretreatment liquid.

A pretreatment liquid contains a component that aggregates a coloring material component of an aqueous ink applied to the ink jet printing device 10. Examples of the component that aggregates the coloring material component of the aqueous ink include an organic acid, an inorganic acid, a polyvalent metal ion, and a cationic polymer. By aggregating the coloring material component, bleeding and landing interference can be prevented, and a high-quality image can be obtained.

The pretreatment liquid contains a resin component as an anchor agent for imparting adhesiveness. From a viewpoint of dispersion uniformity in the pretreatment liquid, the resin component is preferably in a contained form of being dispersed in the pretreatment liquid as latex particles, but is not limited thereto.

The pretreatment unit 130 comprises a pretreatment liquid coating device 132 and a pretreatment liquid drying device 136. The plurality of pass rollers 102 are disposed in a transport path of the pretreatment unit 130. The substrate S transported from the sending unit 110 is guided by the pass rollers 102 and is transported to a position facing the pretreatment liquid coating device 132.

The pretreatment liquid coating device 132 comprises the third drive roller 134 that is rotated by the motor (not shown) to transport the substrate S. The pretreatment liquid coating device 132 is a device that coats the printing surface of the substrate S with a pretreatment liquid using a bar coater 22 (see FIG. 2). Details of the pretreatment liquid coating device 132 will be described later. The pretreatment liquid coating device used in the present embodiment is not limited to adopting a method using the bar coater, and may adopt a coating method using a gravure roll such as a gravure coater and a kiss reverse coater, or may be a die coater, ink jet application, or the like.

The pretreatment liquid coating device 132 can end coating with a pretreatment liquid regardless of whether or not the substrate S is transported, as will be described later. Hereinafter, a final position on the printing surface of the substrate S, at which coating with the pretreatment liquid is performed, will be referred to as the "coating end part".

A coating amount of a pretreatment liquid by the pretreatment liquid coating device 132 is preferably in a range of 0.5 gsm (g/m$^2$) or more and 10 gsm or less. In a case where the coating amount of the pretreatment liquid is less than 0.5 gsm, there is a concern that adhesiveness is insufficient because the amount of the pretreatment liquid is not enough. On the other hand, in a case where the coating amount of the pretreatment liquid exceeds 10 gsm, there is a concern that drying is insufficient and transfer to the pass rollers 102 deteriorates. The coating amount of the pretreatment liquid by the pretreatment liquid coating device 132 is more preferably in a range of 0.5 gsm or more and 8 gsm or less and still more preferably in a range of 1 gsm or more and 5 gsm or less.

The substrate S coated with a pretreatment liquid is transported by the third drive roller 134 and is transported to a position facing the pretreatment liquid drying device 136.

The pretreatment liquid drying device 136 comprises a heater 138. The heater 138 is a hot air heater that blows hot air from a plurality of slit nozzles (not shown). The slit nozzles each have a predetermined width in a transport direction of the substrate S. In addition, the slit nozzles are disposed over the entire length of the substrate S in a width direction of the substrate S, which is a direction orthogonal to the transport direction of the substrate S and a direction parallel to the printing surface of the substrate S. The heater 138 blows hot air from the slit nozzles toward the printing surface of the substrate S to dry a pretreatment liquid.

As a unit that dries a pretreatment liquid, a known heating unit is used, for example, radiation such as an infrared heater and heat conduction using heating of the back surface by a heat roller, in addition to convection such as hot air. Preferably, hot air may be used.

In a case where the substrate S is a film, it is preferable that the substrate S is dried at 30° C. or more and 90° C. or less. In a case where the drying temperature is less than 30° C., drying properties are not sufficient, and in a case where the drying temperature exceeds 90° C., the substrate S is deformed, and creases are likely to be generated. The substrate S is more preferably dried at 40° C. or more and 80° C. or less.

In a case where the substrate S is a film, tension applied to the substrate S in a case of being transported in the pretreatment unit 130 is preferably 20 newtons per meter or more and 200 newtons per meter or less. In a case where the tension applied to the substrate S per meter is less than 20 newtons, a portion where a large amount of a pretreatment liquid is applied to one side of the substrate S is generated, and there is a concern that transfer to the pass rollers 102 deteriorates. On the other hand, in a case where the tension is larger than 200 newtons, creases are generated due to heat during drying, the quality of a printed material is not allowable, and the waste length increases. The term "waste length" refers to a length of a region of the substrate S, which is consumed but cannot be used as a product, in the transport direction. The tension applied to the substrate S in a case of being transported in the pretreatment unit 130 is more preferably 40 newtons per meter or more and 200 newtons per meter or less.

The substrate S having the printing surface on which a pretreatment liquid is dried is transported from the pretreatment unit 130 to the printing unit 140.

[Printing Unit]

The printing unit 140 (an example of an "ink applying device") applies an ink to the printing surface of the substrate S to print an image. The printing unit 140 comprises the first suction drum 142, the second suction drum 144, an ink jet unit 146, a scanner unit 148, and a non-contact turn unit 150.

The substrate S transported from the pretreatment unit 130 to the printing unit 140 is transported to the first suction drum 142.

The first suction drum 142 is disposed on the upstream side of the ink jet unit 146 and the scanner unit 148 in the transport path.

The first suction drum 142 is rotated by the motor (not shown) and transports the substrate S by adsorbing the substrate S on an outer peripheral surface thereof. The first suction drum 142 has a plurality of adsorption holes (not shown) in the outer peripheral surface. The first suction drum 142 adsorbs the substrate S onto the outer peripheral surface as the suction holes are sucked by a pump (not shown).

The substrate S transported by the first suction drum 142 is guided by the pass rollers 102 and is transported to the second suction drum 144.

The second suction drum 144 is disposed on a downstream side of the ink jet unit 146 and the scanner unit 148 in the transport path. The second suction drum 144 is rotated by the motor (not shown) and transports the substrate S by adsorbing the substrate S on an outer peripheral surface thereof. The configuration of the second suction drum 144 is the same as that of the first suction drum 142.

The ink jet unit 146 and the scanner unit 148 are disposed in the transport path between the first suction drum 142 and the second suction drum 144.

The ink jet unit 146 is disposed at a position facing the substrate S to be transported. The ink jet unit 146 coats the printing surface of the substrate S with an aqueous color ink to print a color image. The ink jet unit 146 comprises ink jet heads 146K, 146C, 146M, and 146Y. In addition, the ink jet unit 146 comprises ink jet heads 146W1 and 146W2 disposed on the downstream side of the ink jet heads 146K, 146C, 146M, and 146Y in the transport path.

Each of the ink jet heads 146K, 146C, 146M, 146Y, 146W1, and 146W2 is composed of a line type recording head that can perform printing on the substrate S, which is transported by the transport unit 100, with one time of scanning. Each of the ink jet heads 146K, 146C, 146M, 146Y, 146W1, and 146W2 comprises a nozzle surface (not shown) in which a plurality of nozzles, which are outlets for an aqueous ink, are two-dimensionally arranged. The ink jet heads 146K, 146C, 146M, 146Y, 146W1, and 146W2 are disposed at constant intervals along the transport path. In addition, each of the nozzle surfaces of the ink jet heads 146K, 146C, 146M, 146Y, 146W1, and 146W2 is disposed to face the pass rollers 102.

Each of the ink jet heads 146K, 146C, 146M, 146Y, 146W1, and 146W2 can be configured by connecting a plurality of head modules in the width direction of the substrate S.

The ink jet heads 146K, 146C, 146M, and 146Y jet black (K), cyan (C), magenta (M), and yellow (Y) aqueous inks, respectively. In addition, both the ink jet heads 146W1 and 146W2 jet a white (W) aqueous ink. The aqueous ink is supplied to each of the ink jet heads 146K, 146C, 146M, 146Y, 146W1, and 146W2 from an ink tank (not shown) of a corresponding color via a pipe path (not shown).

The term "aqueous ink" means an ink obtained by dissolving or dispersing a coloring material such as a dye and a pigment in water and a solvent soluble in water. Herein, an aqueous pigment ink is used as the aqueous ink. As the pigment of each of the black, cyan, magenta, and yellow aqueous inks, an organic pigment is used. On the other hand, as the pigment of the white aqueous ink, titanium oxide is used. The viscosity of each aqueous ink is 0.5 millipascal seconds or more and 5.0 millipascal seconds or less. The aqueous ink is thickened by reacting with a pretreatment liquid.

The substrate S transported to the printing unit 140 is transported to a position facing the ink jet heads 146K, 146C, 146M, and 146Y. Liquid droplets of an aqueous ink are jetted from at least one of the ink jet heads 146K, 146C, 146M, or 146Y toward the printing surface of the substrate S, and the jetted liquid droplets adhere to the substrate S, so that an image is printed on the printing surface of the substrate S.

Although the configuration where aqueous inks of four colors are used has been described herein, ink colors and the number of colors are not limited to the present embodiment. For example, an ink jet head that jets a pale color ink such as light magenta and light cyan, a special color ink such as green, orange, and violet, a clear ink, and a metallic ink may be added. In addition, disposition order of the ink jet heads of the respective colors is also not particularly limited.

The substrate S on which a color image is printed by the ink jet heads 146K, 146C, 146M, and 146Y is guided by the pass rollers 102 and is transported to a position facing the ink jet heads 146W1 and 146W2. Liquid droplets of an aqueous white ink are jetted from at least one of the ink jet heads 146W1 or 146W2 toward the printing surface of the substrate S, and the jetted liquid droplets adhere to the substrate S, so that a white background image is printed on the printing surface of the substrate S.

Although a configuration where the two ink jet heads 146W1 and 146W2 are used has been described herein, only one ink jet head may be used or three or more ink jet heads may be used.

Aqueous color inks and an aqueous white ink coating the printing surface of the substrate S in the printing unit 140 are subjected to a condensation thickening reaction with a pretreatment liquid coating the printing surface of the substrate S in the pretreatment unit 130.

The substrate S on which a white background image is printed by the ink jet heads 146W1 and 146W2 is guided by the pass rollers 102 and is transported to a position facing the scanner unit 148.

The scanner unit 148 is disposed on the downstream side of the ink jet unit 146 in the transport path and at a position facing the printing surface of the substrate S to be transported. The scanner unit 148 examines a test pattern image such as a nozzle check pattern printed on the substrate S by the ink jet heads 146K, 146C, 146M, 146Y, 146W1, and 146W2.

The scanner unit 148 comprises a first scanner 148A and a second scanner 148B. Each of the first scanner 148A and the second scanner 148B includes an imaging device that images a test pattern image printed on the printing surface of the substrate S and that converts the image into an electric signal. A color charge coupled device (CCD) linear image sensor can be used as the imaging device. A color complementary metal oxide semiconductor (CMOS) linear image sensor can also be used instead of the color CCD linear image sensor.

Each of the first scanner 148A and the second scanner 148B reads a test pattern image printed on the printing surface of the substrate S from a printing surface side. The test pattern image read by the first scanner 148A and the second scanner 148B is determined by a processor 200 (see FIG. 10), and a defective nozzle is identified.

The substrate S on which a test pattern image has been examined by the first scanner 148A and the second scanner 148B is guided downward by the second suction drum 144 and is transported to the non-contact turn unit 150.

The non-contact turn unit 150 is disposed between the second suction drum 144 and the first drying unit 160 in the transport path. The non-contact turn unit 150 changes the orientation of the transport path from downward to upward without coming into contact with the printing surface of the substrate S. An air roll can be applied to the non-contact turn unit 150. The non-contact turn unit 150 changes the orientation of the transport path of the substrate S from downward to upward by 180 degrees by causing the substrate S to be floated from a guide surface (not shown) by a predetermined floating amount. Since the non-contact turn unit 150 does not come into contact with the printing surface, an image printed on the printing surface is not affected.

The non-contact turn unit 150 may comprise an air amount control device that adjusts the amount of air to be blown and a temperature control device that controls the temperature of air to be blown. The temperature of the air is involved in the elongation of the substrate S. In addition, the amount of the air is involved in the floating amount of the substrate S.

The substrate S of which a traveling direction is changed by the non-contact turn unit 150 is guided by the pass rollers 102 and is transported from the printing unit 140 to the first drying unit 160.

[First Drying Unit]

The first drying unit 160 is a drying device that dries an aqueous ink coating the printing surface of the substrate S. The first drying unit 160 is disposed on the downstream side of the printing unit 140 in the transport path.

The first drying unit 160 comprises a first drying furnace 162, a plurality of first hot air heaters 164, the first folding-back roller 166, and a first camera 168. The first drying furnace 162 (an example of a "first drying device") is a rectangular parallelepiped housing that covers the substrate S from the surroundings. Inside the first drying furnace 162, the plurality of pass rollers 102, the plurality of first hot air heaters 164, and the first folding-back roller 166 are disposed.

The substrate S transported from the printing unit 140 to the first drying unit 160 is guided to the plurality of pass rollers 102 and is transported from an entrance of the first drying furnace 162 toward the first folding-back roller 166 disposed at a central portion of the first drying furnace 162.

The plurality of first hot air heaters 164 are disposed in the transport path from the entrance of the first drying furnace 162 to the first folding-back roller 166. Each of the first hot air heaters 164 is disposed with a blowing surface facing the printing surface of the substrate S. Each of the first hot air heaters 164 functions as a heating device that blows hot air toward the printing surface of the substrate S to heat the substrate S and dries an ink applied to the printing surface.

As a unit that dries an ink, a known heating unit is used, for example, radiation such as an infrared heater and heat conduction using heating of the back surface by a heat roller, in addition to convection such as hot air. Preferably, hot air may be used.

In a case where the substrate S is a film, it is preferable that the substrate S is dried at 30° C. or more and 90° C. or less. In a case where the drying temperature is less than 30° C., drying properties are not sufficient, and in a case where the drying temperature exceeds 90° C., the substrate S is deformed, and creases are likely to be generated. The substrate S is more preferably dried at 40° C. or more and 60° C. or less.

The first folding-back roller 166 is rotated by the motor (not shown) and comes into contact with a surface opposite to the printing surface of the substrate S to transport the substrate S. The first folding-back roller 166 folds the substrate S transported toward the central portion of the first drying furnace 162 toward an outer side of the first drying furnace 162.

The first drying unit 160 guides the substrate S transported by the first folding-back roller 166 toward the outer side of the first drying furnace 162 with the plurality of pass rollers 102 and transports the substrate S to an exit of the first drying furnace 162. As described above, the first drying unit 160 secures a path length required for drying with the plurality of pass rollers 102.

In a case where the substrate S is a film, tension applied to the substrate S in a case of being transported in the first drying unit 160 is preferably 20 newtons per meter or more and 150 newtons per meter or less. In a case where the tension applied to the substrate S per meter is less than 20 newtons, transport inside the first drying furnace 162 is not stable, and the waste length increases. On the other hand, in a case where the tension is larger than 150 newtons, a pressing force on the pass rollers 102 is excessively large, and there is a concern that transfer to the pass rollers 102 deteriorates. In a case where the substrate S is a film, the tension applied to the substrate S in a case of being transported in the first drying unit 160 is more preferably 20 newtons per meter or more and 100 newtons per meter or less.

It is preferable that the pass rollers 102 of the first drying unit 160 are attachable and detachable one by one. With such a configuration, even in a case where dirt is generated on the pass rollers 102, cleaning can be easily performed. In addition, it is preferable that the pass rollers 102 are made of lightweight aluminum, and it is desirable that a known surface treatment, such as an alumite treatment and a hard chrome plating treatment, is performed. In addition, from a viewpoint of transfer suppression and reduction of a cleaning load, it is also preferable to perform a water repellent treatment using Teflon (registered trademark) or the like.

The first camera 168 is disposed on the outer side of the first drying furnace 162 on an exit side. The first camera 168 (an example of an "imaging device") images the printing surface of the substrate S and acquires a captured image of the printing surface of the substrate S.

The substrate S of which the printing surface is imaged by the first camera 168 is transported from the first drying unit 160 to the second drying unit 170 via the pass rollers 102.

[Second Drying Unit]

The second drying unit 170 is a drying device that further dries an aqueous ink on the printing surface of the substrate S dried by the first drying unit 160. The second drying unit 170 may be an auxiliary drying device for the first drying unit 160. The second drying unit 170 is disposed on the downstream side of the first drying unit 160 in the transport path.

The second drying unit 170 comprises a second drying furnace 172, a plurality of second hot air heaters 174, the second folding-back roller 176, and a second camera 178. The second drying furnace 172 (an example of a "second drying device") is a rectangular parallelepiped housing that covers the substrate S from the surroundings. Inside the second drying furnace 172, the plurality of pass rollers 102, the plurality of second hot air heaters 174, and the second folding-back roller 176 are disposed.

The substrate S transported from the first drying unit 160 to the second drying unit 170 is guided to the plurality of pass rollers 102 and is transported from an entrance of the second drying furnace 172 toward the second folding-back roller 176 disposed at a central portion of the second drying furnace 172.

The plurality of second hot air heaters 174 are disposed in the transport path from the entrance of the second drying furnace 172 to the second folding-back roller 176. Each of the second hot air heaters 174 is disposed with a blowing surface facing the printing surface of the substrate S. Each of the second hot air heaters 174 functions as a heating device that blows hot air toward the printing surface of the substrate S to heat the substrate S and dries an ink applied to the printing surface.

As a unit that dries an ink, a known heating unit is used, for example, radiation such as an infrared heater and heat conduction using heating of the back surface by a heat roller, in addition to convection such as hot air. Preferably, hot air may be used.

In a case where the substrate S is a film, it is preferable that the substrate S is dried at 30° C. or more and 90° C. or less. In a case where the drying temperature is less than 30° C., drying properties are not sufficient, and in a case where the drying temperature exceeds 90° C., the substrate S is deformed, and creases are likely to be generated. The substrate S is more preferably dried at 40° C. or more and 80° C. or less.

The first drying unit 160 and the second drying unit 170 are configured to set set temperatures in the first drying furnace 162 and the second drying furnace 172 to temperatures different from each other. It is preferable to set the first drying unit 160 to a relatively high set temperature to promote early drying of an ink.

The second folding-back roller 176 is rotated by the motor (not shown) and comes into contact with a surface opposite to the printing surface of the substrate S to transport the substrate S. The second folding-back roller 176 folds the substrate S transported toward the central portion of the second drying furnace 172 toward the outer side of the second drying furnace 172.

The second drying unit 170 guides the substrate S transported by the second folding-back roller 176 toward the outer side of the second drying furnace 172 with the plurality of pass rollers 102 and transports the substrate S to an exit of the second drying furnace 172.

Tension applied to the substrate S in a case of being transported in the second drying unit 170 is the same as in the first drying unit 160. In addition, the pass rollers 102 of the second drying unit 170 are the same as the pass rollers 102 of the first drying unit 160.

The substrate S transported from the exit of the second drying furnace 172 to the outside of the second drying furnace 172 is dried to a degree that an ink on the printing surface of the substrate S is not back-transferred to the opposite surface in a case where the substrate S is wound.

The second camera 178 is disposed on the outer side of the second drying furnace 172 on the exit side. The second camera 178 (an example of the "imaging device") images the printing surface of the substrate S and acquires a captured image of the printing surface of the substrate S.

The substrate S of which the printing surface is imaged by the second camera 178 is transported from the second drying unit 170 to the examination unit 180 via the pass rollers 102.

[Examination Unit]

The examination unit 180 comprises a third scanner 182, the fourth drive roller 184, and a fifth drive roller 186.

The third scanner 182 examines an image printed on the printing surface of the substrate S. The configuration of the third scanner 182 is the same as those of the first scanner 148A and the second scanner 148B. The third scanner 182 is disposed on a side of the opposite surface to the printing surface of the substrate S and reads the image printed on the printing surface of the substrate S from the surface opposite to the printing surface. The image read by the third scanner 182 is determined as to whether the image is good or bad by the processor 200 (see FIG. 10).

The substrate S on which an image is examined by the third scanner 182 is guided by the pass rollers 102 and is transported to the fourth drive roller 184. The fourth drive roller 184 is rotated by the motor (not shown), comes into contact with the substrate S, and transports the substrate S. The substrate S transported by the fourth drive roller 184 is transported to the fifth drive roller 186. The fifth drive roller 186 is rotated by a motor (not shown), comes into contact with the substrate S, and transports the substrate S.

The substrate S is transported from the first drying unit 160 to the winding unit 120.

[Winding Unit]

The winding unit 120 (an example of a "winding device") comprises the winding roll 122. The plurality of pass rollers 102 are disposed in the transport path of the winding unit 120. The substrate S transported from the first drying unit 160 is guided by the pass rollers 102 and is wound around the winding roll 122.

The ink jet printing device 10 configured as described above manufactures a printed material by transporting the substrate S to the sending unit 110, the pretreatment unit 130, the printing unit 140, the first drying unit 160, the second drying unit 170, the examination unit 180, and the winding unit 120 in this order and performing each treatment on the substrate S.

<Pretreatment Liquid Coating Device>

Figure 2:
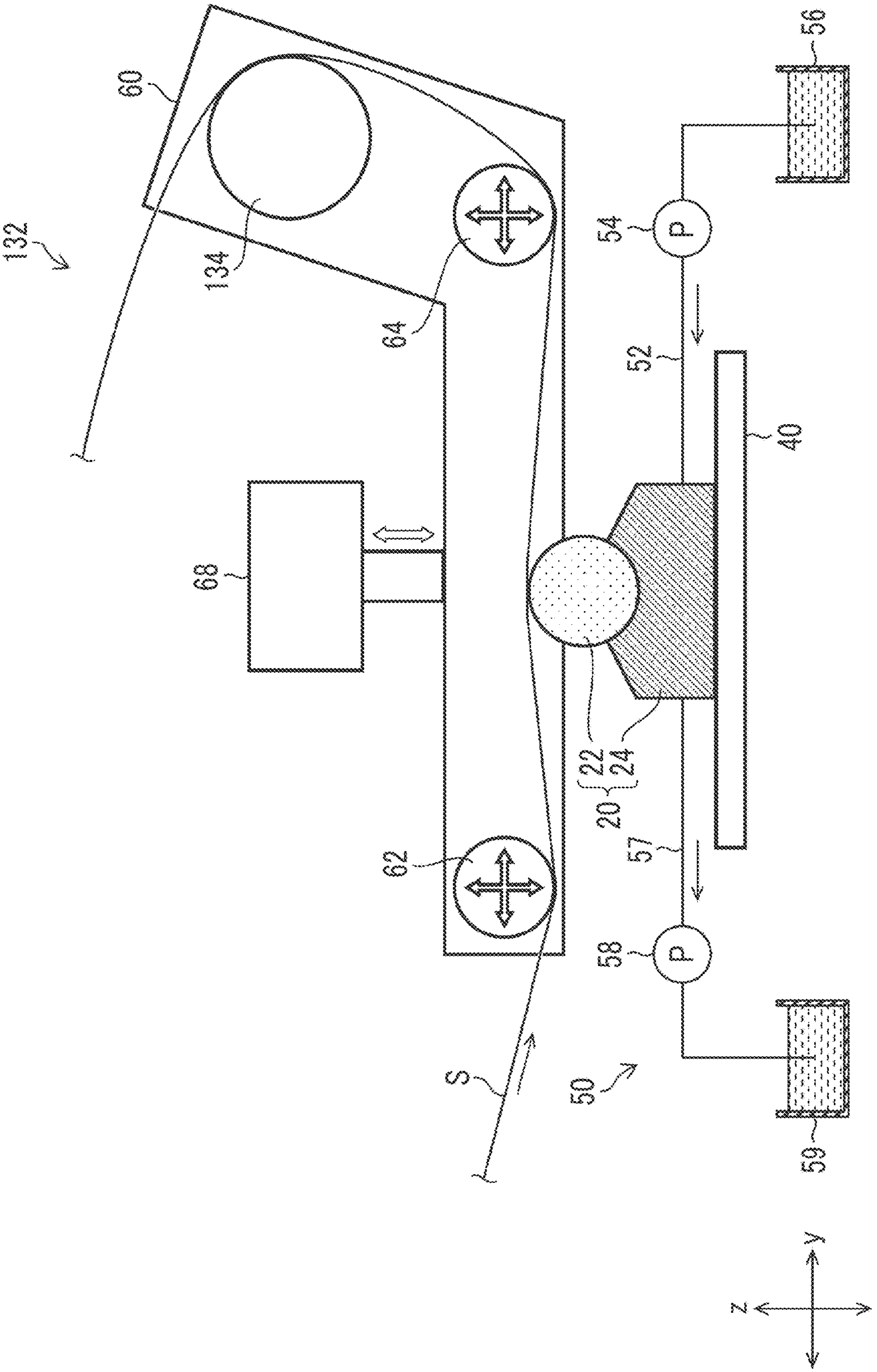
FIG. 2 is an overall configuration view of a pretreatment liquid coating device.

FIG. 2 is an overall configuration view of the pretreatment liquid coating device 132. The pretreatment liquid coating device 132 supplies a pretreatment liquid to the bar coater 22 comprised in a bar block 20 and brings the substrate S into contact with the bar coater 22 to apply the pretreatment liquid to the printing surface of the substrate S. The contact between the substrate S and the bar coater 22 includes a state where the pretreatment liquid is present between the substrate S and the bar coater 22.

[Configuration Example of Pretreatment Liquid Coating Device]

The pretreatment liquid coating device 132, the bar block 20, a base 40, and a pretreatment liquid supply device 50 are comprised. The bar block 20 comprises the bar coater 22 and a bar support portion 24. Details of the bar block 20 will be described later.

The bar coater 22 is rotatable by using a bar support mechanism (not shown) comprised in the bar support portion 24 and is attachably and detachably supported. The bar coater 22 is connected to a bar drive device (not shown). The bar drive device comprises a motor that is a drive source of the bar coater 22 and a mechanical mechanism that connects a rotation shaft of the motor to the bar coater 22.

The bar support mechanism that supports the bar coater 22 has, for example, a support structure corresponding to a plurality of bar coaters 22 in which a coating effective length in a longitudinal direction corresponding to the width of the substrate S is different. The bar coater 22 corresponding to coating conditions such as the width of the substrate S can be applied to the pretreatment liquid coating device 132.

The bar block 20 is supported by the base 40. The base 40 comprises a mechanism that adjusts horizontality representing an angle with respect to a horizontal plane in the width direction of the substrate S. Hereinafter, the width direction of the substrate S will be referred to as a substrate width direction, and the transport direction of the substrate S will be referred to as a substrate transport direction. The substrate width direction is a direction penetrating the plane of FIG. 2. In FIG. 2, the substrate transport direction is represented by a reference numeral y, and a vertical direction is represented by a reference numeral z.

In the bar block 20, the angle of the base 40 with respect to the horizontal plane is adjusted, and the bar coater 22 is brought into parallel contact with the substrate S. Accordingly, variations in a lap width and variations in a pressure generated between a pretreatment liquid and the substrate S attributable to unevenness of the contact of the substrate S with respect to the bar coater 22 can be suppressed. The lap width is the length of a region where the substrate S and the bar coater 22 are in contact with each other in the substrate width direction.

The bar block 20 is periodically maintained by performing cleaning, part replacement, and the like. The bar block 20 is detached from the base 40 during maintenance. In addition, the bar block 20 is mounted on the base 40 after maintenance.

That is, the base 40 attachably and detachably constitutes the bar block 20. In addition, the base 40 adopts a structure having high reproducibility of the disposition position of the bar block 20. Accordingly, both improvement of maintenance efficiency of the bar block 20 and maintenance of a coating performance before and after maintenance can be achieved.

The pretreatment liquid supply device 50 comprises a supply flow passage 52, a liquid feeding pump 54, and a pretreatment liquid tank 56. A pretreatment liquid stored in the pretreatment liquid tank 56 is supplied to the bar block 20 via the liquid feeding pump 54 and the supply flow passage 52.

In the pretreatment liquid supply device 50, the amount of a pretreatment liquid applied to the bar coater 22 can be precisely controlled by controlling the amount of the liquid fed to the bar block 20. It is preferable that the liquid feeding pump 54 is a type in which pulsation in a case of liquid feeding is suppressed.

In addition, the pretreatment liquid supply device 50 comprises a circulation flow passage 57, a circulation pump 58, and a collection tank 59. A pretreatment liquid discharged from the bar block 20 is collected to the collection tank 59 via the circulation flow passage 57 and the circulation pump 58. It is preferable that the circulation pump 58 is a type in which pulsation in a case of liquid feeding is suppressed, as in the liquid feeding pump 54.

A pretreatment liquid collected to the collection tank 59 may be returned to the pretreatment liquid tank 56 and be supplied to the bar block 20. A flow passage connecting the collection tank 59 and the pretreatment liquid tank 56 may comprise a filter, a densitometer, and the like.

The pretreatment liquid coating device 132 comprises a transport mechanism 60 and a raising and lowering device 68. The transport mechanism 60 comprises a first lift roller 62, a second lift roller 64, and the third drive roller 134. A motor (not shown) is connected to the third drive roller 134. The third drive roller 134 rotates in response to an operation of the motor, supports the substrate S, and transports the substrate S.

The first lift roller 62 and the second lift roller 64 support the substrate S in a region where a pretreatment liquid coats the substrate S from the bar block 20 and adjust the magnitude of a lap angle of the substrate S with respect to the bar coater 22 and a distance between the substrate S and the bar coater 22.

Each of the first lift roller 62 and the second lift roller 64 is configured to be individually movable. Arrow lines attached to the first lift roller 62 are movement directions of the first lift roller 62 and represent directions of pressing forces applied to the substrate S using the first lift roller 62. The first lift roller 62 can be moved in the substrate transport direction and the vertical direction.

Arrow lines attached to the second lift roller 64 are movement directions of the second lift roller 64 and represent directions of pressing forces applied to the substrate S using the second lift roller 64. The second lift roller 64 can be moved in the substrate transport direction and the vertical direction, like the first lift roller 62.

The size of the lap angle of the substrate S with respect to the bar coater 22 can be individually adjusted on a primary side and a secondary side of the bar coater 22. The same applies to the distance between the substrate S and the bar coater 22. Herein, the primary side is the upstream side of the bar coater 22 in the substrate transport direction and is a left side of the bar coater 22 in FIG. 2. The secondary side is the downstream side of the bar coater 22 in the substrate transport direction and is a right side of the bar coater 22 in FIG. 2.

The lap angle of the substrate S with respect to the bar coater 22 is preferably in a range of 2.0 degrees or more and 30 degrees or less. In a case where the lap angle of the substrate S with respect to the bar coater 22 is less than 2.0 degrees, a contact surface between the bar coater 22 and the substrate S is not stable, and coating unevenness of a pretreatment liquid on the substrate S occurs in some cases. On the other hand, in a case where the lap angle of the substrate S with respect to the bar coater 22 exceeds 30 degrees, step-like coating unevenness of the pretreatment liquid on the substrate S occurs in some cases due to a frictional force generated between the bar coater 22 and the substrate S. A more preferable range of the lap angle of the substrate S with respect to the bar coater 22 is 5.0 degrees or more and 20 degrees or less.

In a case where the state of the substrate S in the substrate width direction is different, a distribution of tension applied to the substrate S in the substrate width direction is generated at a position where the substrate S and the bar coater 22 come into contact with each other, and coating unevenness of a pretreatment liquid in the substrate width direction occurs in some cases.

It is preferable that the heat roller is comprised at a position on the upstream side of the bar coater 22 in the substrate transport direction, the state of the substrate S in the substrate width direction is made uniform, and coating unevenness of a pretreatment liquid in the substrate width direction is suppressed.

The heat roller has a columnar shape and has a length corresponding to the length of the substrate S in the substrate width direction. The heat roller incorporates a heat source such as a heater and supplies heat released from the heat source to the substrate S. The heat roller comes into contact with the substrate S by applying constant tension to the substrate S to smooth the substrate S.

The raising and lowering device 68 moves the transport mechanism 60 in the vertical direction to adjust a distance between the substrate S and the bar block 20 in the vertical direction. In a case of coating the substrate S with a pretreatment liquid, the raising and lowering device 68 lowers the transport mechanism 60 to bring the substrate S into contact with the bar coater 22. On the other hand, in a case where the substrate S is not coated with the pretreatment liquid, the raising and lowering device 68 raises the transport mechanism 60 to separate the substrate S from the bar coater 22.

[Structural Example of Bar Block]

Figure 3:
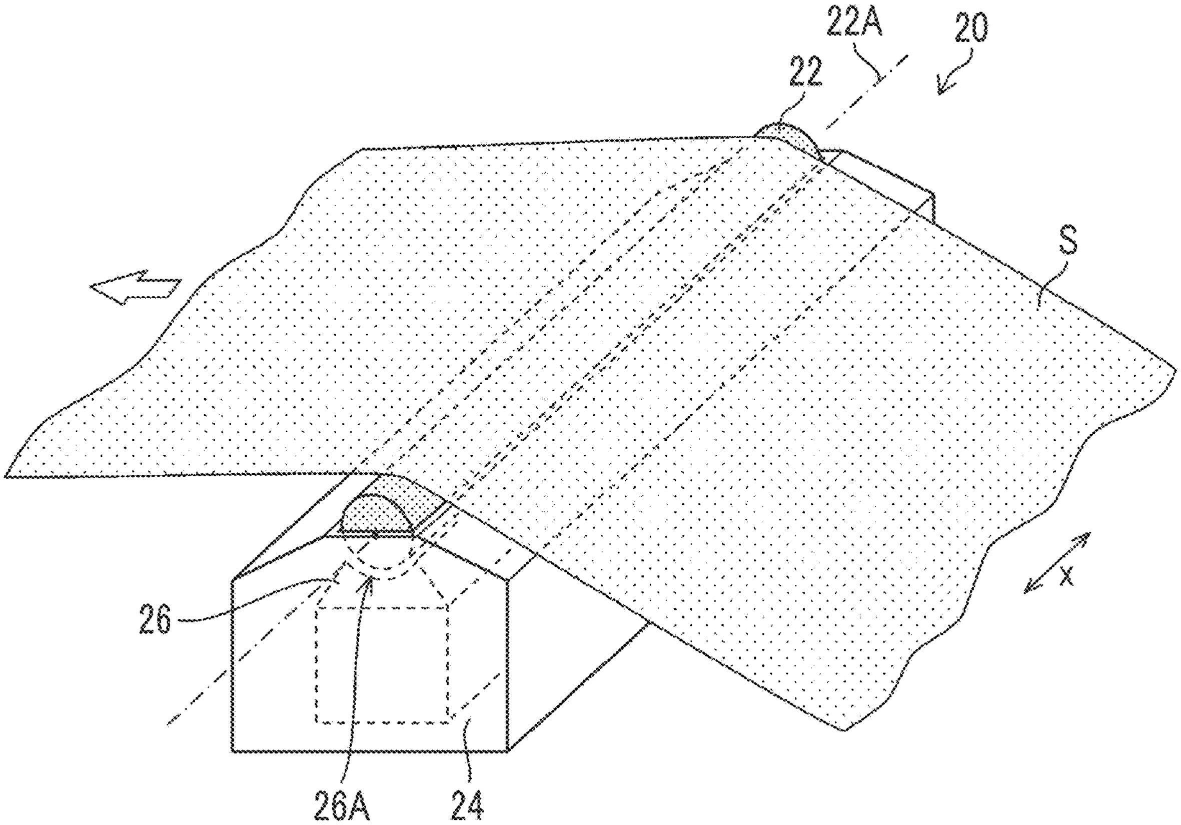
FIG. 3 is a perspective view of a bar block comprised in the pretreatment liquid coating device.

FIG. 3 is a perspective view of the bar block 20 comprised in the pretreatment liquid coating device 132. As shown in FIG. 3, the bar block 20 comprises the bar coater 22 and the bar support portion 24. The bar coater 22 has a columnar shape of which a length in a central axis 22A direction along the substrate width direction is longer than the width of the substrate S. A reference numeral x shown in FIG. 3 represents the substrate width direction.

The bar support portion 24 comprises a bar receiving member 26 that rotatably supports the bar coater 22 via a bearing (not shown) attached to a central axis 22A of the bar coater 22.

The bar receiving member 26 has a length in the substrate width direction corresponding to the length of the bar coater 22 in the substrate width direction. The bar receiving member 26 supports the bar coater 22 over the entire length in the substrate width direction by suppressing deflection of the bar coater 22 in a certain range.

The bar receiving member 26 comprises a bar facing surface 26A that has a curved surface corresponding to a side surface of the bar coater 22. The bar receiving member 26 has a support structure that supports the bar coater 22 at a position where a distance between the central axis 22A of the bar coater 22 and the bar facing surface 26A exceeds the radius of the bar coater 22. That is, the bar receiving member 26 supports the side surface of the bar coater 22 to face the bar facing surface 26A in a noncontact manner. In addition, the bar receiving member 26 supports the bar coater 22 at a position where a part of the bar coater 22 is exposed.

Figure 4:
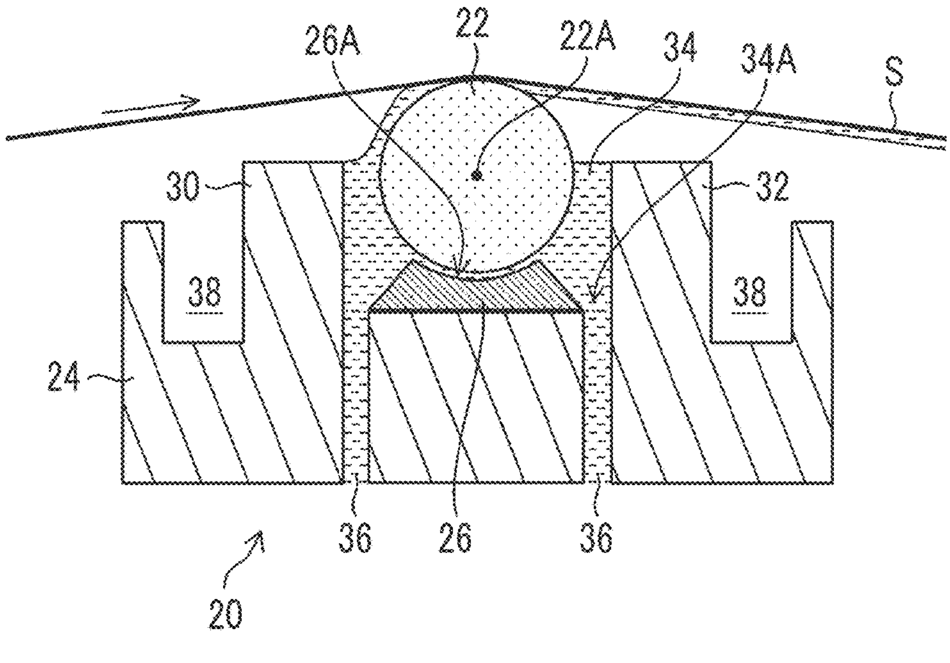
FIG. 4 is a schematic view showing an internal structure of the bar block.

FIG. 4 is a schematic view showing an internal structure of the bar block 20 and shows a cross section of the bar support portion 24 in a direction parallel to the transport direction of the substrate S. The bar support portion 24 comprises a liquid pool 34 that is compartmented by an upstream weir 30 and a downstream weir 32 and where a pretreatment liquid is stored. The bar receiving member 26 is disposed inside the liquid pool 34.

A bottom surface 34A of the liquid pool 34 is formed at one end of the slit 36. The slit 36 communicates with the supply flow passage 52 (see FIG. 2). A pretreatment liquid is supplied to the liquid pool 34 from the supply flow passage 52 via the slit 36. The bar coater 22 is supported at a position where a part thereof is immersed in the pretreatment liquid stored in the liquid pool 34.

The liquid pool 34 has a length in the substrate width direction that is longer than a total length of the bar coater 22 and the bar receiving member 26 in the substrate width direction. The slit 36 has a length in the substrate width direction corresponding to the length of the liquid pool 34 in the substrate width direction.

Herein, an aspect in which the slit 36 is formed at each of a position on the upstream side and a position on the downstream side of the bar receiving member 26 in the substrate transport direction and each end of the slit 36 is formed in the bottom surface 34A of the liquid pool 34 has been described as an example, but the structure of the slit 36 is not limited to the aspect shown in FIG. 4. For example, the slit 36 on the upstream side and the slit 36 on the downstream side may be combined, and one end of the combined flow passage may be formed at a position on the upstream side or the downstream side of the bar receiving member 26 in the substrate transport direction with respect to the bottom surface 34A of the liquid pool 34.

The width of the slit 36 in the transport direction of the substrate S is preferably 0.5 millimeters or more and 5.0 millimeters or less. In a case where the width of the slit 36 is less than 0.5 millimeters, the slit 36 is likely to be clogged with a pretreatment liquid. On the other hand, in a case where the width of the slit 36 exceeds 5.0 millimeters, an effect of pulsation of a liquid feeding pump (not shown) of the pretreatment liquid is likely to be received. A preferable width of the slit 36 is 1.0 millimeters or more and 4.0 millimeters or less.

A structure where a plurality of slits shorter than the length of the bar coater 22 in the substrate width direction are arranged may be applied to the slit 36. The plurality of short slits may be arranged in a zigzag manner to correspond to the entire length of the bar coater 22 in the substrate width direction. A plurality of through holes may be applied instead of the slit 36.

The bar support portion 24 comprises collection grooves 38. The collection grooves 38 are disposed at a position of the upstream weir 30 in the transport direction of the substrate S and at a position on the downstream side of the downstream weir 32 in the substrate transport direction. The collection grooves 38 each have a structure that is inclined to a front side or a rear side of FIG. 4.

A pretreatment liquid that has overflowed the liquid pool 34 flows into the collection grooves 38. The collection grooves 38 communicate with the circulation flow passage 57 (see FIG. 2). The pretreatment liquid flowing into the collection grooves 38 may be collected to the collection tank 59 (see FIG. 2) via the circulation flow passage 57 and the circulation pump 58 (see FIG. 2). The pretreatment liquid collected to the collection tank 59 may be supplied to the bar block 20 via the supply flow passage 52 and the liquid feeding pump 54 (see FIG. 2).

The shape of the bar block 20 is not limited to the shape shown in FIG. 4. For example, the upstream weir 30 and the downstream weir 32 shown in FIG. 4 may have a shape having an inclination in a tip part.

In a case where a surface shape of a pretreatment liquid supplied to the side surface of the bar coater 22 is a problem due to instability of meniscuses of air and the pretreatment liquid entrained by the rotating bar coater 22, the shapes of the bar receiving member 26, the upstream weir 30, and the downstream weir 32 may be devised to adjust a flow of the pretreatment liquid and to optimize the surface shape of the pretreatment liquid.

During an operating period of the pretreatment liquid coating device 132, the bar coater 22 is rotated in a state where a space between the bar coater 22 and the bar receiving member 26 is filled with a pretreatment liquid. The pretreatment liquid functions as a lubricant, and abrasion of the bar coater 22 and the bar receiving member 26 is suppressed.

In consideration of the high-speed rotation of the bar coater 22, a material having a relatively small frictional resistance may be applied to the bar receiving member 26. A material for the bar receiving member 26 may be a resin material and a material obtained by infusing the resin material into a metal material.

[Structural Example of Bar Coater]

The diameter of the bar coater 22 is 5.0 millimeters or more and 15 millimeters or less. In a case where the diameter of the bar coater 22 is less than 5.0 millimeters, the stiffness of the bar coater 22 is insufficient, vibration occurs during rotation, and there is a concern of deterioration of the surface shape of a pretreatment liquid attributable to the vibration. On the other hand, in a case where the diameter of the bar coater 22 exceeds 15 millimeters, the coating amount of the pretreatment liquid is excessive, and it is difficult to make the pretreatment liquid on the substrate S into a thin layer. The diameter of the bar coater 22 is preferably 8.0 millimeters or more and 13 millimeters or less.

The mass of the bar coater 22 per meter is 0.5 kilograms or more and 3.0 kilograms or less. In a case where the mass of the bar coater 22 per meter is less than 0.5 kilograms, vibration is likely to occur during rotation. On the other hand, in a case where the mass of the bar coater 22 per meter exceeds 3.0 kilograms, the mass increases, and replacement is difficult.

Figure 5:
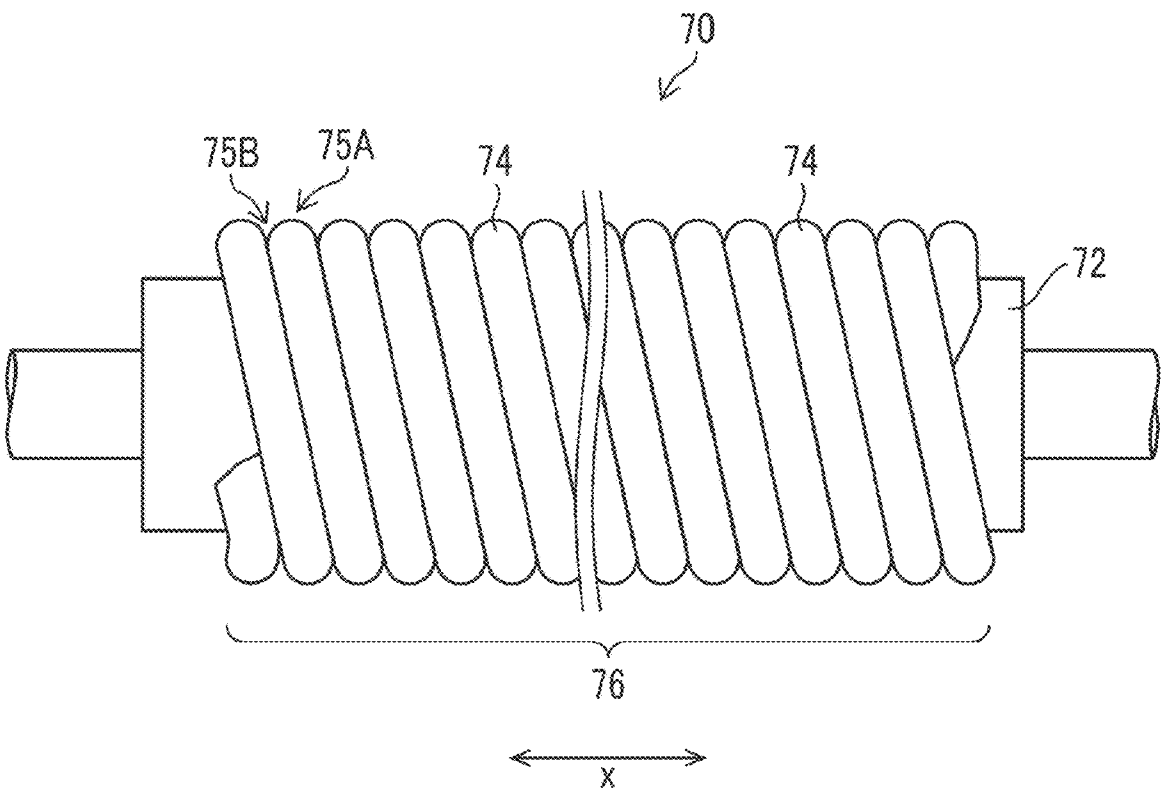
FIG. 5 is a view showing a wire bar coater.

FIG. 5 is a view showing a wire bar coater. As shown in FIG. 5, a wire bar coater 70 is produced by winding a wire 74 around a side surface of a columnar core material 72 to form a wire column 76. The wire bar coater 70 can change the volume of a pretreatment liquid held in a non-concave portion 75B between adjacent portions of the wire 74 in the substrate width direction by changing the thickness of the wire 74. Accordingly, it is possible to accurately coat with the pretreatment liquid having a desired thickness.

In addition, the wire bar coater 70 comprises a concave portion 75A and the non-concave portion 75B and has a structure in which the non-concave portion 75B is continuous. Accordingly, a pretreatment liquid held by the bar coater 22 is continuous, and uniformity of the pretreatment liquid transferred to the substrate S is obtained.

Figure 6:
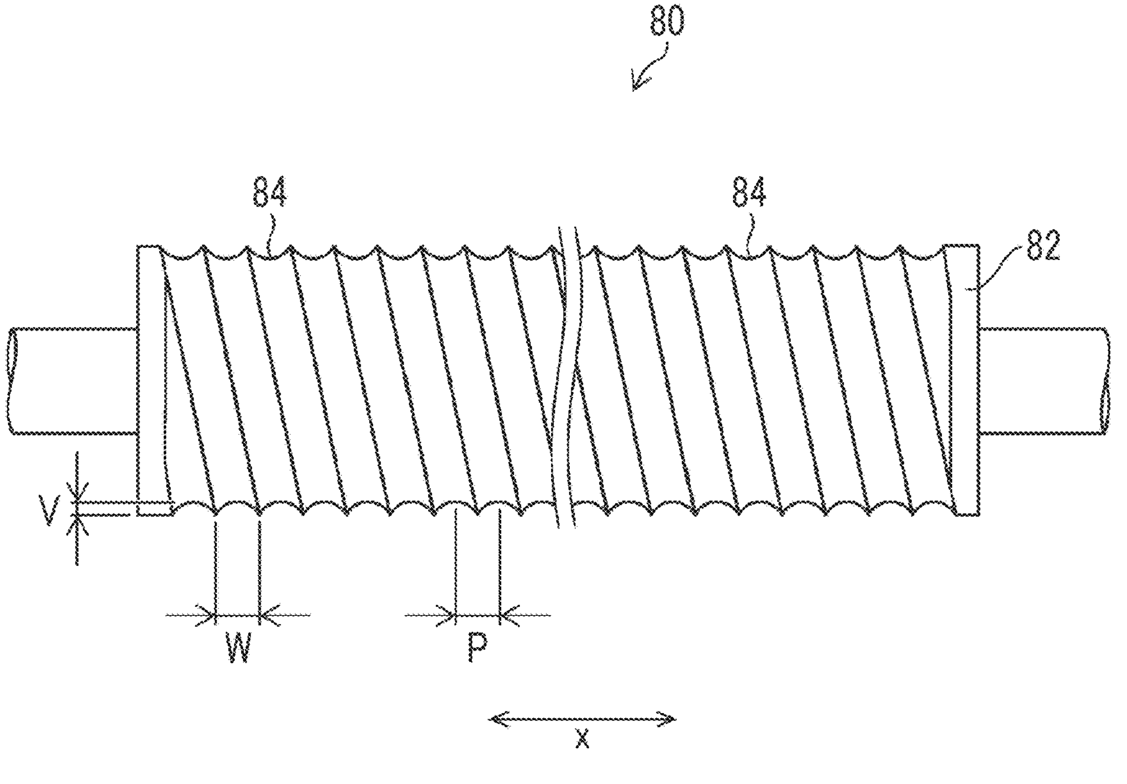
FIG. 6 is a view showing a wireless bar coater.

FIG. 6 is a view showing a wireless bar coater. As shown in FIG. 6, a wireless bar coater 80 has a spiral groove 84 in a side surface of a columnar core material 82. In the wireless bar coater 80, a pitch P of the groove 84, a width W of the groove 84, and a depth V of the groove 84 are defined.

Since the spiral groove 84 of the wireless bar coater 80 is continuous, a pretreatment liquid held by the wireless bar coater 80 is continuous, and uniformity of the pretreatment liquid transferred to the substrate S can be obtained. In a case where an isolated cell such as the gravure roll is used to hold the pretreatment liquid, the bottom of the cell is clogged with components of the pretreatment liquid, and the coating amount fluctuates.

That is, the wire bar coater 70 and the wireless bar coater 80 have a structure where a pretreatment liquid held on the side surface is continuous and can avoid fluctuations in the coating amount coating the substrate S.

Figure 7A:
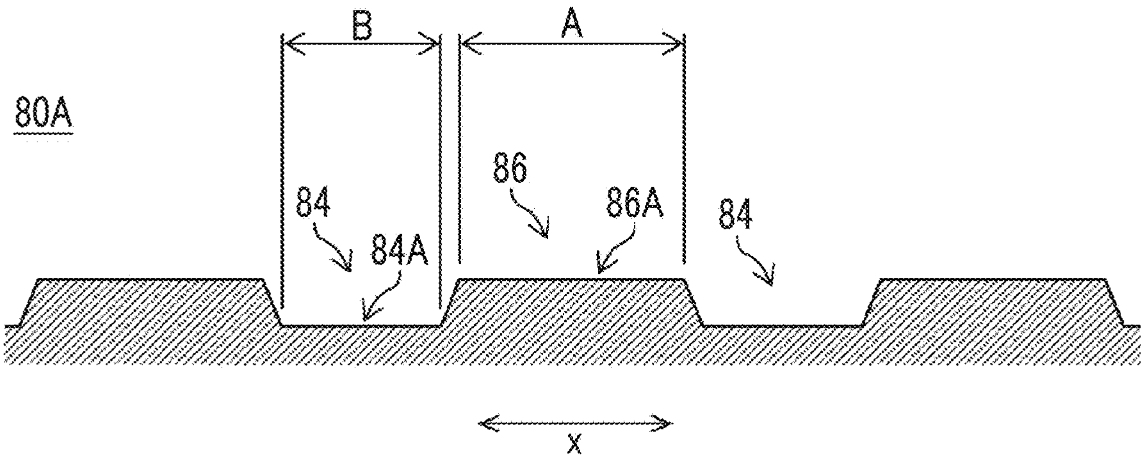
FIGS. 7A and 7B are enlarged views of a side surface of the wireless bar coater.
Figure 7B:
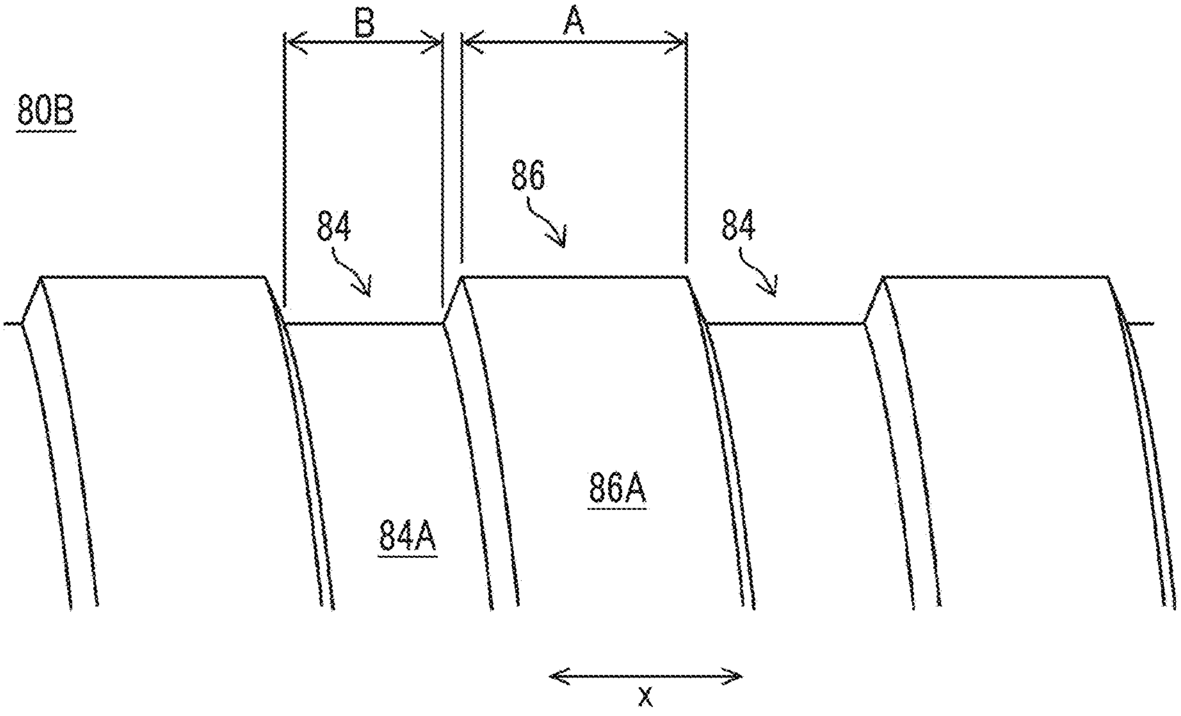

FIGS. 7A and 7B are enlarged views of a side surface of the wireless bar coater 80. A reference numeral 80A shown in FIG. 7A is a cross sectional view of the wireless bar coater 80 in the transport direction of the substrate S. In addition, a reference numeral 80B shown in FIG. 7B is a partially enlarged view of a part of the side surface of the wireless bar coater 80. The groove 84 of the wireless bar coater 80 has a bottom surface 84A which is a flat surface having a certain area. A non-groove portion 86 between the adjacent grooves 84 of the wireless bar coater 80 has an upper surface 86A having a certain area.

In a case where the length of the upper surface 86A of the non-groove portion 86 is defined as A and the length of the bottom surface 84A of the groove 84 in a longitudinal direction of the wireless bar coater 80 is defined as B, a relationship of $B/A \leq 1$ is satisfied.

As the area of the bottom surface 84A of the groove 84 is small and the shape thereof is close to a linear shape, unevenness occurs in the thickness of a pretreatment liquid in a case where the pretreatment liquid is transferred from the bar coater 22 to the substrate S.

The bar coater 22 may be any of the wire bar coater 70 or the wireless bar coater 80. It is preferable to apply the wireless bar coater 80, on which dirt is relatively unlikely to accumulate than the wire bar coater 70 and a failure attributable to wire breakage does not occur, to the bar coater 22.

The wire 74 of the wire bar coater 70 and the groove 84 of the wireless bar coater 80 are surfaces orthogonal to the central axis 22A of the bar coater 22, and in a case of being inclined with respect to a surface parallel to the longitudinal direction of the bar coater 22, a pretreatment liquid surface shape improvement effect can be obtained. Angles at which the wire 74 and the groove 84 are inclined can be defined as appropriate depending on the surface shape of the pretreatment liquid.

As a material for the bar coater 22, a metal can be applied. From a viewpoint of a corrosion resistance to a pretreatment liquid, the material for the bar coater 22 is preferably stainless steel. Examples of stainless steel applied to the bar coater 22 include SUS304 and SUS316. In a case where the pretreatment liquid is acidic, it is preferable to apply a material having an acid resistance to the bar coater 22. SUS is an abbreviation for Steel Use Stainless.

It is preferable that a surface treatment such as hard chrome plating, diamond coating, and ceramic coating is performed on the side surface of the bar coater 22. Accordingly, an abrasion resistance can be improved. It is preferable that a hydrophobic surface treatment is performed on the side surface of the bar coater 22. Accordingly, it is possible to reduce friction against a pretreatment liquid in a case where the bar coater 22 rotates.

Rolette processing may be performed on an end part of the bar coater 22 in the longitudinal direction as an anti-slip, anti-falling-out, and anti-rotation. An effective coating length of the bar coater 22 in the longitudinal direction can be in a range of 100 millimeters or more and 1,500 millimeters or less.

It is preferable that a pretreatment liquid held on the side surface of the bar coater 22 immediately before the pretreatment liquid is transferred from the bar coater 22 to the substrate S forms a three-dimensional continuous state. The pretreatment liquid held on the side surface of the bar coater 22 immediately before the pretreatment liquid is transferred from the bar coater 22 to the substrate S has fluctuations in a thickness in a cross section along the substrate transport direction smaller than fluctuations in a thickness in a cross section along the substrate width direction.

Accordingly, thin film coating suitability can be imparted at a high speed and uniformly to the pretreatment liquid coating device 132. By using such a pretreatment liquid coating device 132, it is possible to prevent concentration unevenness of an ink and close attachment unevenness of the ink such as local peeling of the ink in a case of applying the ink to the substrate S.

<Composition and Preparation of Pretreatment Liquid>

A composition example of a pretreatment liquid L1 which is an example of a pretreatment liquid used in the present embodiment is as follows.

Malonic acid (manufactured by FUJIFILM Wako Pure Chemical Corporation): 4.0 percent by mass Triisopropanolamine (manufactured by FUJIFILM Wako Pure Chemical Corporation): 0.5 percent by mass Acrylic resin particles A1: 8.0 percent by mass as the amount of resin particles 1,2-propanediol (manufactured by FUJIFILM Wako Pure Chemical Corporation): 10 percent by mass Antifoaming agent TSA-739 (product number) (manufactured by Momentive Performance Materials Japan GK, an emulsion type silicone antifoaming agent): 15.0 percent by mass (0.01 percent by mass as the solid content of the antifoaming agent)

Water: Remainder to be 100 percent by mass in total

The pretreatment liquid L1 is prepared as follows.

By using an aqueous dispersion of the acrylic resin particles A1, 8 percent by mass of the acrylic resin particles A1 is contained in the pretreatment liquid L1 as the amount of resin particles (C). The aqueous dispersion of the acrylic resin particles A1 is prepared as follows.

3.0 grams of a 62 percent by mass aqueous solution of sodium dodecylbenzenesulfonate (manufactured by Tokyo Chemical Industry Co., Ltd.) and 376 grams of water are added to a 1,000-milliliter three-neck flask comprising a stirrer and a cooling pipe, and the mixture is heated to 90° C. under a nitrogen atmosphere.

The following solutions A, B, and C are simultaneously added dropwise to the heated mixed solution in the three-neck flask for 3 hours. After completion of the dropwise addition, the mixture is further reacted for 3 hours to obtain a 500-gram aqueous dispersion liquid of the acrylic resin particles A1. The solid content of the aqueous dispersion liquid of the acrylic resin particles A1, which is the amount of the acrylic resin particles A1, is 10.1 percent by mass.

The solution A is a solution obtained by dissolving 11.0 grams of a 50 percent by mass aqueous solution of sodium 2-acrylamide-2-methylpropanesulfonate (manufactured by Sigma-Aldrich Co., LLC.) in 20 grams of water.

The solution B is a solution obtained by mixing 12.5 grams of 2-hydroxyethyl methacrylate (manufactured by FUJIFILM Wako Pure Chemical Corporation), 5.0 grams of 2-(2-ethoxy)ethyl acrylate (manufactured by Tokyo Chemical Industry Co., Ltd.), 17.0 grams of benzyl acrylate (manufactured by Tokyo Chemical Industry Co., Ltd.), and 10.0 grams of styrene (manufactured by FUJIFILM Wako Pure Chemical Corporation).

The solution C is a solution obtained by dissolving 6.0 grams of sodium persulfate (manufactured by FUJIFILM Wako Pure Chemical Corporation) in 40 grams of water. A glass transition temperature of the acrylic resin particles A1 is 26° C. In addition, a weight-average molecular weight of the acrylic resin particles A1 is 69,000.

An organic solvent in a pretreatment liquid is preferably less than 5 percent by mass and is more preferably substantially not contained (an example of "does not contain"). In a case where the organic solvent is contained in a large amount, drying properties decrease, and the pretreatment liquid is likely to be transferred to the pass rollers 102 due to the action of plasticizing a resin. The expression "substantially not contained" means that the organic solvent is not contained at all or the organic solvent is contained in an amount that does not adversely affect the effects of the present invention even in a case where the organic solvent is contained. By adding only a trace amount of the organic solvent to the pretreatment liquid, cleanability of the pass rollers 102 can be improved.

The composition and the preparation of the pretreatment liquid L1 are examples, and the ink jet printing device 10 can apply a pretreatment liquid that has another composition and that is generated via another preparation. Examples of pretreatment liquids having other compositions are shown in FIGS. 8 and 9.

FIG. 8 is a table showing a composition example of a pretreatment liquid L2 according to another specific example. As shown in FIG. 8, as a surfactant, SURFYNOL 465 (1%, manufactured by Nisshin Chemical Co., Ltd., product name) can be applied. As the surfactant, polyoxyethylene alkyl ether, such as EMULGEN 1108 (manufactured by Kao Corporation, product name), EMULGEN 1150S-60 (manufactured by Kao Corporation, product name), and EMULGEN 1118S-70 (manufactured by Kao Corporation, product name), or the like can be used.

FIG. 9 is a table showing a composition example of a pretreatment liquid L3 according to still another specific example. As shown in FIG. 9, as an acrylic emulsion, VINNIBRAN 2687 (manufactured by Nissin Chemical Co., Ltd., product name) or the like can be applied. As a chlorinated polyolefin emulsion, SUPERCHLON E-604 (chlorination degree of 21%, manufactured by Nippon Paper Industries Co., Ltd., product name) or the like can be used. As the surfactant, OLFINE E1010 (manufactured by Nissin Chemical Co., Ltd., product name) or the like can be applied.

<Physical Properties of Pretreatment Liquid>

[Viscosity]

The viscosity of a pretreatment liquid is preferably in a range of 0.5 millipascal seconds or more and 5.0 millipascal seconds or less. In a case where the viscosity of the pretreatment liquid is less than 0.5 millipascals, fluidity of the pretreatment liquid is excessively high, and the pretreatment liquid is scattered in some cases. On the other hand, in a case where the viscosity of the pretreatment liquid exceeds 5.0 millipascal seconds, the fluidity of the pretreatment liquid is excessively low so that leveling is difficult, and the surface shape of the pretreatment liquid deteriorates in some cases.

[Surface Tension]

The surface tension of a pretreatment liquid is preferably in a range of 30 millinewtons or more and 45 millinewtons or less. In a case where the surface tension of the pretreatment liquid is less than 30 millinewtons, streaky coating unevenness occurs in the pretreatment liquid coating the substrate S in some cases. On the other hand, in a case where the surface tension of the pretreatment liquid exceeds 45 millinewtons, wettability with respect to the substrate S is insufficient in some cases.

[Specific Example of Pretreatment Liquid]

The pretreatment liquid contains a component that aggregates a coloring material component of an aqueous ink applied to an ink jet printing device. Examples of the component that aggregates the coloring material component of the aqueous ink include an organic acid, an inorganic acid, a polyvalent metal ion, and a cationic polymer.

A pretreatment liquid contains a resin component from a viewpoint of ensuring adhesiveness to the substrate S. From a viewpoint of dispersion uniformity in the pretreatment liquid, it is preferable that the resin component has a contained form of being dispersed in the pretreatment liquid as latex particles. The surfactant is likely to be adsorbed on an edge part of latex dispersed in the pretreatment liquid, and lubricity between the bar coater 22 and the bar receiving member 26 can be improved.

An average particle diameter of latex contained in a pretreatment liquid is preferably in a range of 30 nanometers or more and 500 nanometers or less. In a case where the average particle diameter of the latex is less than 30 nanometers, once the pretreatment liquid is formed into a film, the continuous film becomes excessively strong, and it is difficult to clean in a case where the continuous film clogs the groove 84 (see FIG. 6) of the wireless bar coater 80 or the like. On the other hand, in a case where the average particle diameter of the latex exceeds 500 nanometers, the dispersibility of the latex in the pretreatment liquid is insufficient, and clogging attributable to soft aggregation of the latex occurs in some cases.

The concentration of solid contents of latex in a pretreatment liquid is preferably in a range of 5.0% or more and 30% or less. In a case where the concentration of solid contents is less than 5.0%, the adhesiveness of the pretreatment liquid to the substrate S is insufficient in some cases. On the other hand, in a case where the concentration of solid contents exceeds 30%, the viscosity of the pretreatment liquid becomes excessively high, and the coating amount of the pretreatment liquid with respect to the substrate S increases in some cases.

A surfactant is added to a pretreatment liquid. Accordingly, as lubricity of the pretreatment liquid improves, lubricity between the bar coater 22 and the bar receiving member 26 improves, and a shearing force during the rotation of the bar coater 22 is expected to decrease. An addition amount of the surfactant is preferably in a range of 0.1 percent by mass or more and 0.2 percent by mass or less. In a case where the addition amount of the surfactant is less than 0.1 percent by mass, it is difficult to obtain the effect.

<Configuration of Control System of Ink Jet Printing Device>

Figure 10:
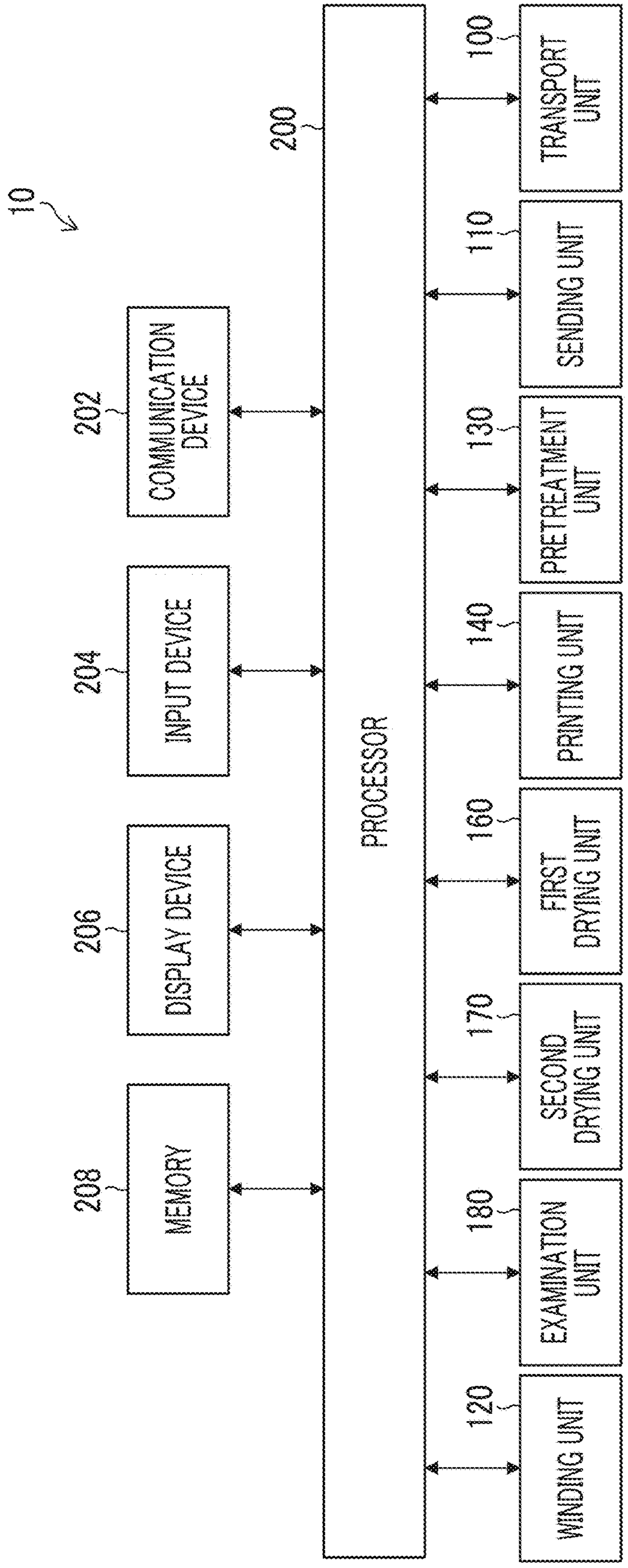
FIG. 10 is a block diagram showing a configuration of a control system of the ink jet printing device.

FIG. 10 is a block diagram showing a configuration of a control system of the ink jet printing device 10. As shown in FIG. 10, the ink jet printing device 10 comprises the processor 200, a communication device 202, an input device 204, a display device 206, and a memory 208.

The processor 200 executes a command stored in the memory 208. A hardware structure of the processor 200 includes various types of processors described below. The various types of processors include a central processing unit (CPU) that is a general-purpose processor which executes software (program) and which functions as various types of processing units, a graphics processing unit (GPU) that is a processor specialized in image processing, and a dedicated electric circuit or the like that is a processor having a dedicated circuit configuration designed to execute certain processing, such as a programmable logic device (PLD) and an application specific integrated circuit (ASIC) which are processors of which a circuit configuration can be changed after manufacturing a field programmable gate array (FPGA) or the like.

The processor 200 may be composed of one of the various types of processors or may be composed of two or more processors of the same type or different types (for example, a plurality of FPGAs, a combination of the CPU and the FPGA, or a combination of the CPU and the GPU).

Further, the hardware structure of the various types of processors is, more specifically, an electric circuit (circuitry) in which circuit elements such as semiconductor elements are combined.

In addition to the communication device 202, the input device 204, the display device 206, and the memory 208, the processor 200 is communicably connected to the transport unit 100, the sending unit 110, the winding unit 120, the pretreatment unit 130, the printing unit 140, the first drying unit 160, the second drying unit 170, and the examination unit 180.

The processor 200 controls driving of the transport unit 100. That is, the processor 200 controls the motor (not shown) that drives each of the first drive roller 114, the second drive roller 116, the third drive roller 134, the first suction drum 142, the second suction drum 144, the first folding-back roller 166, the second folding-back roller 176, the fourth drive roller 184, and the winding roll 122 and applies predetermined tension to the substrate S to transport the substrate S. In addition, the processor 200 stops the transport of the substrate S with the transport unit 100 at the time of the end of printing.

The processor 200 controls the sending unit 110. That is, the processor 200 controls the corona treatment unit 118 to perform a corona discharge treatment on the printing surface of the substrate S.

The processor 200 controls the pretreatment unit 130. That is, the processor 200 controls the pretreatment liquid coating device 132 to coat the printing surface of the substrate S with a pretreatment liquid. In addition, the processor 200 controls the heater 138 to dry the pretreatment liquid on the printing surface of the substrate S at a predetermined temperature.

The processor 200 controls the printing unit 140. That is, the processor 200 controls the ink jet unit 146 to print an image on the printing surface of the substrate S. In addition, the processor 200 controls the scanner unit 148 to acquire read data of a test pattern image printed on the printing surface of the substrate S.

The processor 200 controls the first drying unit 160. That is, the processor 200 controls the first hot air heaters 164 to dry an ink on the printing surface of the substrate S at a predetermined temperature. In addition, the processor 200 controls the first camera 168 to image the printing surface of the substrate S, acquires information on the presence or absence of a pretreatment liquid applied to the printing surface of the substrate S from the captured image, and detects whether or not the coating end part has reached the position of the first camera 168 (the exit of the first drying furnace 162).

The processor 200 controls the second drying unit 170. That is, the processor 200 controls the second hot air heaters 174 to dry an ink on the printing surface of the substrate S at a predetermined temperature. In addition, the processor 200 controls the second camera 178 to image the printing surface of the substrate S, acquires information on the presence or absence of a pretreatment liquid applied to the printing surface of the substrate S from the captured image, and detects whether or not the coating end part has reached the position (the exit of the second drying furnace 172) of the second camera 178.

The processor 200 controls the examination unit 180. That is, the processor 200 controls the third scanner 182 to acquire read image data of an image printed on the printing surface of the substrate S.

The communication device 202 comprises a required communication interface and transmits and receives data to and from a host computer or the like (not shown) connected to the communication interface.

The input device 204 comprises an operation button (not shown), a keyboard (not shown), and a pointing device (not shown). The input device 204 outputs input instructional information to the processor 200. The processor 200 executes various types of processing in accordance with input information input from the input device 204.

The display device 206 comprises a display such as a liquid crystal display (LCD). The display device 206 displays required information on the display in response to an instruction from the processor 200.

The memory 208 stores a command to be executed by the processor 200. The memory 208 includes a random access memory (RAM) (not shown) and a read only memory (ROM) (not shown). The processor 200 executes software using various types of programs and parameters stored in the ROM with the RAM as a work region and executes various types of processing of the ink jet printing device 10 using the parameters stored in the ROM or the like.

In addition, the memory 208 functions as a temporary storage unit of various types of data including image data, and data is read and written through the processor 200. The image data taken from the host computer via the communication device 202 is stored in the memory 208.

The processor 200 executes required signal processing on image data stored in the memory 208 to generate dot data. In addition, the processor 200 controls driving of the ink jet heads 146K, 146C, 146M, 146Y, 146W1, and 146W2 of the printing unit 140 in accordance with the generated dot data to print an image represented by the image data on the substrate S.

Dot data is generally generated by performing color conversion processing and halftone processing on image data. The color conversion processing is processing of converting image data (for example, image data of RGB 8 bits) expressed in sRGB or the like into ink amount data of each of colors including C, M, Y, and K used in the ink jet printing device 10. The halftone processing is processing of converting the ink amount data of each of colors generated through the color conversion processing into dot data of each of colors through processing such as error diffusion.

<Control Method of Ink Jet Printing Device>

Figure 11:
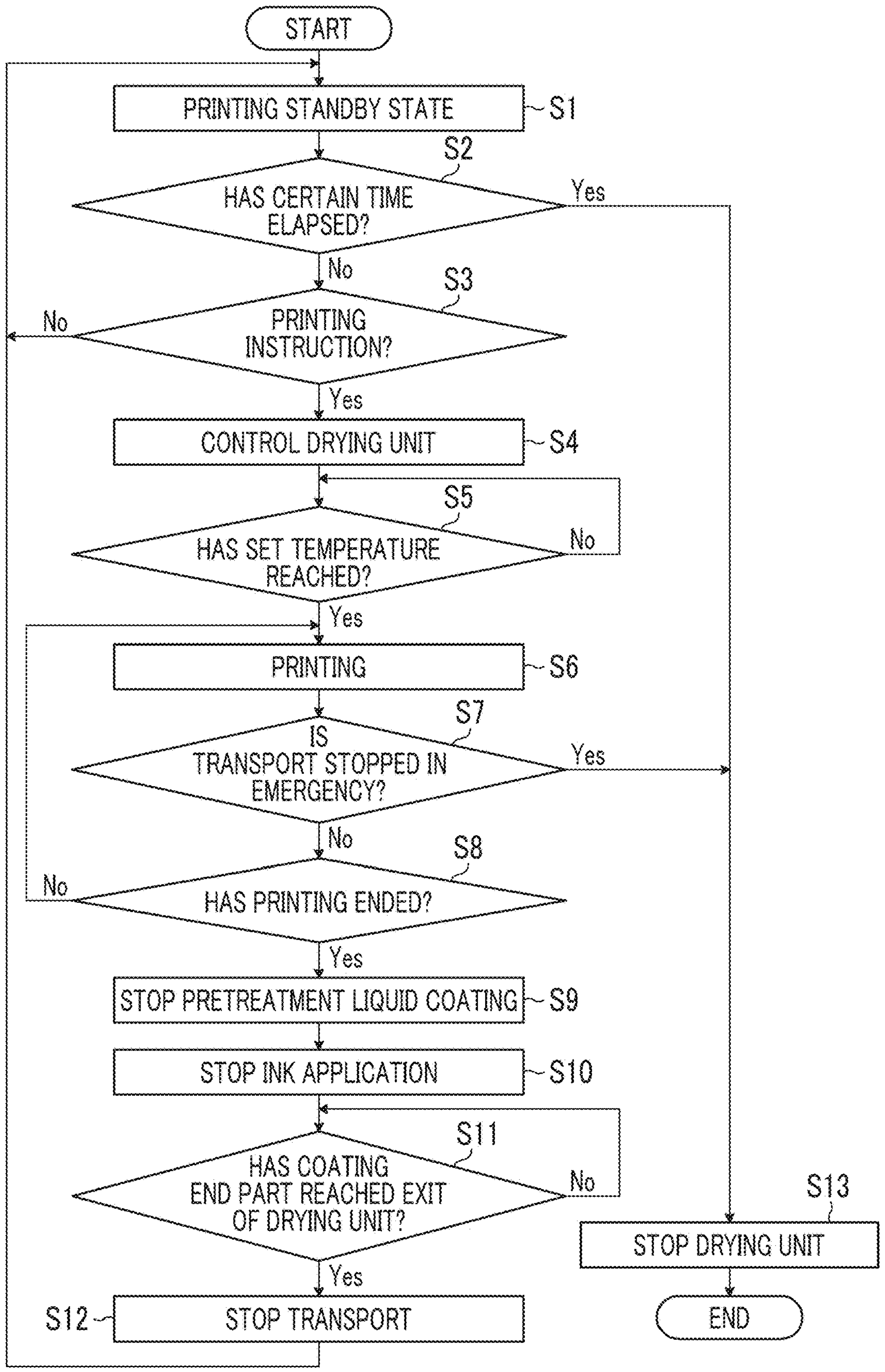
FIG. 11 is a flowchart showing each step of a control method of an ink jet printing device.

A control method of an ink jet printing device that prevents accumulation of dirt of the drying device caused by a pretreatment liquid will be described. FIG. 11 is a flowchart showing each step of the control method of an ink jet printing device. The control method of an ink jet printing device is realized as the processor 200 reads out and executes a control program of the ink jet printing device from the memory 208. The control program of the ink jet printing device may be provided via the communication device 202. The control method of an ink jet printing device suppresses transfer of the pretreatment liquid to the pass rollers 102 of the first drying unit 160 and the second drying unit 170.

In step S1, the processor 200 brings the ink jet printing device 10 into a printing standby state (an example of a "printing standby mode"). For example, in a case where power of the ink jet printing device 10 is input and in a case where instructed printing is ended (an example of "after printing ends"), the processor 200 brings the ink jet printing device 10 into a printing standby state. The printing standby state is a state where transport of the substrate S by the transport unit 100, coating of a pretreatment liquid by the pretreatment unit 130, and application of an ink by the printing unit 140 are stopped. In addition, in the printing standby state, the first drying unit 160 is set to a first standby temperature, and the second drying unit 170 is set to a second standby temperature. That is, the processor 200 sets the plurality of first hot air heaters 164 to the first standby temperature (an example of a "third temperature") and sets the plurality of second hot air heaters 174 to the second standby temperature.

By setting the first standby temperature and the second standby temperature to be lower than a first printing temperature of the first drying unit 160 and a second printing temperature of the second drying unit 170, which are temperatures during printing to be described later, respectively, the pretreatment liquid can be prevented from being transferred to the pass rollers 102 of the first drying unit 160 and the second drying unit 170. It is more preferable that the first standby temperature and the second standby temperature are lower than a softening temperature Ts of the resin component included in the pretreatment liquid. That is, it is preferable that a relationship of the first printing temperature>the softening temperature Ts>the first standby temperature and a relationship of the second printing temperature>the softening temperature Ts>the second standby temperature are satisfied. The softening temperature is a temperature of any one of a glass transition temperature Tg, a minimum filming temperature (MFT), or a melting point of the resin component contained in the pretreatment liquid.

In step S2, the processor 200 determines whether or not a certain time has elapsed since the printing standby state is set. In a case where the certain time has elapsed (an example of "after the certain time has elapsed"), processing proceeds to step S13. In step S13, the processor 200 stops the plurality of first hot air heaters 164 and the plurality of second hot air heaters 174 and ends the processing of the present flowchart.

As described above, in a case where the printing standby state continues for a certain time, the inside of the first drying furnace 162 and the inside of the second drying furnace 172 are cooled in the ink jet printing device 10. Accordingly, inside the first drying furnace 162 and the second drying furnace 172, a time for which a region of the substrate S coated with the pretreatment liquid and the surface of the pass roller 102 are high-temperature bonded can be shortened, and transfer and a bonding degree can be reduced.

In a case where the certain time has not elapsed in step S2, processing proceeds to step S3. In step S3, the processor 200 determines whether or not printing is instructed from the input device 204. In a case where the printing is not instructed, processing returns to step S1, and the processor 200 continues the printing standby state. In a case where the printing is instructed, processing proceeds to step S4.

In step S4, the first drying unit 160 is set to the first printing temperature, and the second drying unit 170 is set to the second printing temperature. That is, the processor 200 sets the plurality of first hot air heaters 164 to the first printing temperature (an example of the "first temperature") and sets the plurality of second hot air heaters 174 to the second printing temperature (an example of a "second temperature").

It is preferable to set the first printing temperature to a temperature relatively higher than the second printing temperature and to promote early drying of the substrate S. Since transport of the substrate can be stopped immediately before a timing of moment when a coating end part of a pretreatment liquid application region is discharged from the first drying furnace 162 by ending the drying in the first drying unit 160, without waiting for the coating end part to be described later to be discharged from the second drying furnace 172, the waste length can be reduced.

In addition, by setting the second printing temperature to a relatively low temperature, even in a case where the region of the substrate S coated with the pretreatment liquid remains in the second drying furnace 172, the pretreatment liquid can be made unlikely to be transferred to the pass rollers 102 of the second drying unit 170.

It is more preferable that the second printing temperature is relatively higher than the softening temperature Ts of the resin component contained in the pretreatment liquid. That is, it is preferable that a relationship of the first printing temperature>the softening temperature Ts>the second printing temperature is satisfied.

In subsequent step S5, the processor 200 determines whether or not temperatures inside the first drying furnace 162 and the second drying furnace 172 have reached the first printing temperature and the second printing temperature, respectively, with temperature sensors (not shown) comprised in the first drying unit 160 and the second drying unit 170. In a case where the temperatures inside the first drying furnace 162 and the second drying furnace 172 do not reach the first printing temperature and the second printing temperature, processing of step S5 is repeated. In a case where the temperatures inside the first drying furnace 162 and the second drying furnace 172 have reached the first printing temperature and the second printing temperature, processing proceeds to step S6. A time from the printing instruction to a time when the temperatures inside the first drying furnace 162 and the second drying furnace 172 reach the first printing temperature and the second printing temperature corresponds to a "printing standby time".

In step S6, the ink jet printing device 10 is set to a printing mode. That is, the processor 200 controls the ink jet printing device 10 in accordance with an instruction input from the input device 204 to perform printing. In the printing mode, the processor 200 causes the transport unit 100 to transport the substrate S, performs a corona discharge treatment on the printing surface of the substrate S with the corona treatment unit 118, applies the pretreatment liquid to the printing surface of the substrate S with the pretreatment liquid coating device 132, dries the coating pretreatment liquid with the pretreatment liquid drying device 136, and prints an image on the printing surface of the substrate S with the ink jet unit 146. In addition, the processor 200 dries an ink on the printing surface of the substrate S with the first drying unit 160 and the second drying unit 170, acquires read data of the image printed on the printing surface of the substrate S with the third scanner 182, and winds the printed substrate S around the winding roll 122.

In step S7, the processor 200 determines whether or not transport of the substrate S is stopped in an emergency due to a trouble or the like during printing. In a case of the emergency stop, processing proceeds to step S13. The processing in step S13 is the same as in a case of transition from step S2. As described above, in a case where the transport of the substrate S is stopped in an emergency during printing, the inside of the first drying furnace 162 and the inside of the second drying furnace 172 are cooled in the ink jet printing device 10. Accordingly, inside the first drying furnace 162 and the second drying furnace 172, a time for which the region of the substrate S coated with the pretreatment liquid and the surface of the pass roller 102 are high-temperature bonded can be shortened, and transfer and a bonding degree can be reduced.

In a case where the transport of the substrate S is not stopped in an emergency in step S7, processing proceeds to step S8. In step S8, it is determined whether or not the instructed printing has completely ended. In a case where the printing is not ended, processing returns to step S6, and the processor 200 continues the printing. In a case where the instructed printing has completely ended, processing proceeds to step S9.

In step S9, the processor 200 controls the pretreatment unit 130 to stop coating of the substrate S with the pretreatment liquid. That is, the processor 200 stops the corona discharge treatment by the corona treatment unit 118 and controls the raising and lowering device 68 to separate the substrate S from the bar coater 22. A position of the substrate S immediately before the bar coater 22 is separated is the coating end part.

In step S10, the processor 200 controls the printing unit 140 to stop printing the image on the substrate S. That is, the processor 200 controls the ink jet unit 146 to stop jetting of the ink to the substrate S.

Subsequently, in step S11, the processor 200 determines whether or not the coating end part has reached the exit of the first drying furnace 162 of the first drying unit 160. That is, the processor 200 acquires a captured image of the printing surface of the substrate S from the first camera 168 and determines the presence or absence of the pretreatment liquid applied to the printing surface of the substrate S. In a case where the coating end part has not reached the exit of the first drying furnace 162 of the first drying unit 160, the processor 200 repeats the processing of step S11. On the other hand, in a case where the coating end part has reached the exit of the first drying furnace 162 of the first drying unit 160, processing proceeds to step S12.

In step S12, the processor 200 stops the transport of the substrate S. That is, the processor 200 stops the motors (not shown) of the first drive roller 114, the second drive roller 116, the third drive roller 134, the first suction drum 142, the second suction drum 144, the first folding-back roller 166, the second folding-back roller 176, the fourth drive roller 184, and the winding roll 122.

In a case where the transport of the substrate S is stopped in step S12, processing proceeds to step S1, and the processor 200 brings the ink jet printing device 10 to the printing standby state.

As described above, in the control method of an ink jet printing device, since the transport of the substrate S is stopped after the coating end part of the substrate S reaches the exit of the first drying unit 160 at the time of the end of printing, the region coated with the pretreatment liquid does not remain inside the first drying unit 160 in a state where the pretreatment liquid is not dried, and a non-dried pretreatment liquid and a non-dried ink do not remain in contact with the pass rollers 102 of the first drying unit 160. Therefore, the pretreatment liquid and the ink can be prevented from being transferred to the pass rollers 102, and accumulation of dirt of the first drying device caused by the pretreatment liquid can be prevented.

Herein, although whether or not the coating end part has reached the exit of the first drying furnace 162 is determined from the captured image of the first camera 168, the determination may be made by a transport distance of the substrate S from the pretreatment liquid coating device 132 to the exit of the first drying furnace 162, a time from the stop of coating of the pretreatment liquid by the pretreatment liquid coating device 132, and a transportation speed of the substrate S.

In addition, although the transport of the substrate S is stopped after the coating end part reaches the exit of the first drying furnace 162 herein, the transport of the substrate S may be stopped after the coating end part reaches the exit of the second drying furnace 172. Herein, although whether or not the coating end part has reached the exit of the second drying furnace 172 may be determined from the captured image of the second camera 178, the determination may be made by a transport distance of the substrate S from the pretreatment liquid coating device 132 to the exit of the second drying furnace 172, a time from the stop of coating of the pretreatment liquid by the pretreatment liquid coating device 132, and a transportation speed of the substrate S.

EXPERIMENT

As the control method of an ink jet printing device shown in FIG. 11 is performed in a plurality of experimental examples in which printing conditions are different from each other and a plurality of items of each experimental example are evaluated, appropriate printing conditions are comprehensively determined. FIGS. 12 and 13 are tables showing printing conditions of the experimental examples and evaluation results of each item.

The printing conditions are “pretreatment liquid coating”, “pretreatment liquid drying”, “ink drying”, and “a stop position of a pretreatment liquid coating end part”.

Parameters of “pretreatment liquid coating” are a “coating amount”, the “glass transition temperature Tg of a contained resin”, an “organic solvent amount”, and “tension of the substrate during liquid coating”. The “coating amount” is changed by changing the thickness of the wire 74 of the wire bar coater 70.

Parameters of “pretreatment liquid drying” are a “substrate temperature during drying” and a “remaining water amount of the substrate after drying”. The “substrate temperature during drying” is adjusted by changing the temperature of hot air output from the heater 138. In addition, the “remaining water amount of the substrate after drying” is adjusted by changing a passing time at a position facing the heater 138 and is measured using a Karl Fischer moisture meter (manufactured by Mitsubishi Chemical Analytech Co., Ltd., a trace amount moisture measuring device CA-200 type).

Parameters of “ink drying” are a “printing temperature of the first drying unit 160”, a “standby temperature of the first drying unit 160”, a “printing temperature of the second drying unit 170”, a “standby temperature of the second drying unit 170”, “tension of the substrate during ink drying”, and an “organic solvent remaining amount after drying”. The “organic solvent remaining amount after drying” is a remaining amount of the organic solvent of the pretreatment liquid in a region coated with the pretreatment liquid, which is the region to which an ink is not applied, and is measured by using gas chromatography.

In addition, evaluation items are a “waste length”, a “printing standby time”, “dirt on the pass rollers 102 of the first drying unit 160”, “dirt on the pass rollers 102 of the second drying unit 170”, “image adhesiveness”, and “cleaning frequency of the coating roller (bar coater 22)”, and overall determination thereof.

The evaluation results are classified into six grades including “AA”, “A”, “B”, “C”, “D”, and “E”. “AA” is most preferable, “E” is least preferable, “AA”, “A”, and “B” are acceptable, “C” is “within tolerance”, and “D” and “E” are unacceptable.

The overall determination is classified into three grades including “A”, “C”, and “D”. “A” is most preferable, “A” and “C” are acceptable, and “D” is unacceptable. That is, the printing conditions of the experimental examples determined to be “A” and “C” are appropriate printing conditions.

In addition, the printing conditions common to each experimental example are as follows.

- Substrate: PET, thickness of 25 micrometers (a film of a TAIKO polyester film manufactured by Futamura Chemical Co., Ltd.)
- Substrate width: 800 millimeters
- Transportation speed (coating speed of pretreatment liquid): 50 mpm (50 meters per minute)
- Coating of pretreatment liquid: The pretreatment liquid coating device 132 shown in FIG. 2 is used.
- Drying of pretreatment liquid: 80° C., a wind speed of 20 meters per second (20 m/s), slit nozzle 0.8 millimeters×24 pieces×830 millimeters width, and a drying time of 3 seconds
- Ink jetting: A black solid image obtained by superimposing inks of four colors (K, C, M, and Y) is printed with a resolution of 1,200×1,200 dots per inch (dpi) and a jetting amount of 10 gsm
- Ink drying: A wind speed of 20 m/s, a round hole nozzle of φ8 mm×830 mm width
- Drying time of the first drying unit 160: 45 seconds
- Drying time of the second drying unit 170: 15 seconds
- Pass roller: Manufactured by aluminum, and alumite surface treatment
- Pretreatment liquid: The pretreatment liquid L1 is used as a base. The Tg of a resin changes the Tg of the acrylic resin particles A1, and the content of the organic solvent changes the amount of 1,2-propanediol.

Experiments No. 1 to 9

As shown in FIG. 12, experiments No. 1 to 9 have the following common points. The coating amount of the pretreatment liquid is 3 gsm, the organic solvent amount of the pretreatment liquid is 0 percent by mass, the tension of the substrate during pretreatment liquid coating is 70 newtons per meter (70 N/m), the substrate temperature during pretreatment liquid drying is 80° C., the remaining water amount of the substrate after pretreatment liquid drying is 0.003 gsm, the printing temperature (first printing temperature) of the first drying unit 160 is 80° C., the standby temperature (first standby temperature) of the first drying unit 160 is 80° C., the printing temperature (second printing temperature) of the second drying unit 170 is 80° C., the standby temperature (second standby temperature) of the second drying unit 170 is 80° C., the transport tension of the substrate during ink drying is 70 N/m, and the organic solvent remaining amount of the pretreatment liquid after ink drying is 0 gsm.

Among experiments No. 1 to 9, experiments No. 1 to 3 have a common glass transition temperature Tg of a resin contained in the pretreatment liquid of 45° C. In experiments No. 1 to 3, stop positions of the coating end part of the pretreatment liquid are in the first drying furnace 162, in the second drying furnace 172, and outside the second drying furnace 172 (downstream side of the second drying furnace 172), respectively.

In experiment No. 1, since dirt on the pass rollers 102 of the first drying unit 160 and dirt on the pass rollers 102 of the second drying unit 170 are determined to be D, overall determination is D. In addition, in experiment No. 2, since dirt on the pass rollers 102 of the second drying unit 170 is determined to be D, overall determination is D. On the other hand, in experiment No. 3, each evaluation item is determined to be B or more, and overall determination is A.

Among experiments No. 1 to 9, experiments No. 4 to 6 have a common glass transition temperature Tg of a resin contained in the pretreatment liquid of 65° C. In experiments No. 4 to 6, the stop positions of the coating end part of the pretreatment liquid are in the first drying furnace 162, in the second drying furnace 172, and outside the second drying furnace 172, respectively.

In experiment No. 4, since dirt on the pass rollers 102 of the first drying unit 160 and dirt on the pass rollers 102 of the second drying unit 170 are determined to be D, overall determination is D. In addition, in experiment No. 5, since dirt on the pass rollers 102 of the second drying unit 170 is determined to be D, overall determination is D. On the other hand, in experiment No. 6, each evaluation item is determined to be B or more, and overall determination is A.

Among experiments No. 1 to 9, experiments No. 7 to 9 have a common glass transition temperature Tg of a resin contained in the pretreatment liquid of 85° C. In experiments No. 7 to 9, the stop positions of the coating end part of the pretreatment liquid are in the first drying furnace 162, in the second drying furnace 172, and outside the second drying furnace 172, respectively.

In experiments No. 7 to 9, each evaluation item is determined to be B or more, and overall determination is A in all the experiments.

As described above, in the printing conditions of experiments No. 1 to 9, in a case where the glass transition temperature Tg of the resin contained in the pretreatment liquid is 45° C. or 65° C., it is found that the stop position of the coating end part of the pretreatment liquid needs to be outside the second drying furnace 172. On the other hand, in a case where the glass transition temperature Tg of the resin contained in the pretreatment liquid is 85° C., it is found that the stop position of the coating end part of the pretreatment liquid may be any of in the first drying furnace 162, in the second drying furnace 172, or outside the second drying furnace 172.

Experiments No. 10 to 18

Experiments No. 10 to 18 have the following common points. The coating amount of the pretreatment liquid is 3 gsm, the organic solvent amount of the pretreatment liquid is 0 percent by mass, the tension of the substrate during pretreatment liquid coating is 70 N/m, the substrate temperature during pretreatment liquid drying is 80° C., the remaining water amount of the substrate after pretreatment liquid drying is 0.003 gsm, the printing temperature of the first drying unit 160 is 80° C., the standby temperature of the first drying unit 160 is 80° C., the printing temperature of the second drying unit 170 is 60° C., the standby temperature of the second drying unit 170 is 60° C., the transport tension of the substrate during ink drying is 70 N/m, and the organic solvent remaining amount of the pretreatment liquid after ink drying is 0 gsm.

Among experiments No. 10 to 18, experiments No. 10 to 12 have a common glass transition temperature Tg of a resin contained in the pretreatment liquid of 45° C. In experiments No. 10 to 12, the stop positions of the coating end part of the pretreatment liquid are in the first drying furnace 162, in the second drying furnace 172, and outside the second drying furnace 172, respectively.

In experiment No. 10, since dirt on the pass rollers 102 of the first drying unit 160 is determined to be D, overall determination is D. In addition, in experiments No. 11 and 12, each evaluation item is determined to be C or more, and overall determination is A.

Among experiments No. 10 to 18, experiments No. 13 to 15 have a common glass transition temperature Tg of a resin contained in the pretreatment liquid of 65° C. In experiments No. 13 to 15, the stop positions of the coating end part of the pretreatment liquid are in the first drying furnace 162, in the second drying furnace 172, and outside the second drying furnace 172, respectively.

In experiment No. 13, since dirt on the pass rollers 102 of the first drying unit 160 is determined to be D, overall determination is D. In addition, in experiments No. 14 and 15, each evaluation item is determined to be B or more, and overall determination is A.

Among experiments No. 10 to 18, experiments No. 16 to 18 have a common glass transition temperature Tg of a resin contained in the pretreatment liquid of 85° C. In experiments No. 16 to 18, the stop positions of the coating end part of the pretreatment liquid are in the first drying furnace 162, in the second drying furnace 172, and outside the second drying furnace 172, respectively.

In each of experiments No. 16 to 18, image adhesiveness is determined to be C, and overall determination is C in all the experiments.

As described above, in the printing conditions of experiments No. 10 to 18, in a case where the glass transition temperature Tg of the resin contained in the pretreatment liquid is 45° C., it is found that the stop position of the coating end part of the pretreatment liquid needs to be in the second drying furnace 172 or outside the second drying furnace 172. On the other hand, in a case where the glass transition temperature Tg of the resin contained in the pretreatment liquid is 65° C. or 85° C., it is found that the stop position of the coating end part of the pretreatment liquid may be any of in the first drying furnace 162, in the second drying furnace 172, or outside the second drying furnace 172.

That is, it is preferable that the glass transition temperature Tg of the resin contained in the pretreatment liquid satisfies a relationship of the printing temperature of the first drying unit 160>Tg>the printing temperature of the second drying unit 170.

Experiments No. 19 to 27

Experiments No. 19 to 27 have the following common points. The coating amount of the pretreatment liquid is 3 gsm, the organic solvent amount of the pretreatment liquid is 0 percent by mass, the tension of the substrate during pretreatment liquid coating is 70 N/m, the substrate temperature during pretreatment liquid drying is 80° C., the remaining water amount of the substrate after pretreatment liquid drying is 0.003 gsm, the printing temperature of the first drying unit 160 is 80° C., the standby temperature of the first drying unit 160 is 60° C., the printing temperature of the second drying unit 170 is 80° C., the standby temperature of the second drying unit 170 is 60° C., the transport tension of the substrate during ink drying is 70 N/m, and the organic solvent remaining amount of the pretreatment liquid after ink drying is 0 gsm.

Among experiments No. 19 to 27, experiments No. 19 to 21 have a common glass transition temperature Tg of a resin contained in the pretreatment liquid of 45° C. In experiments No. 19 to 21, the stop positions of the coating end part of the pretreatment liquid are in the first drying furnace 162, in the second drying furnace 172, and outside the second drying furnace 172, respectively.

In experiment No. 19, since dirt on the pass rollers 102 of the first drying unit 160 is determined to be D, overall determination is D. In experiment No. 20, since dirt on the pass rollers 102 of the second drying unit 170 is determined to be C, overall determination is C. In experiment No. 21, each evaluation item is determined to be B or more, and overall determination is A.

As described above, in the printing conditions of experiments No. 19 to 21, in a case where the glass transition temperature Tg of the resin contained in the pretreatment liquid is 45° C., it is found that the stop position of the coating end part of the pretreatment liquid needs to be in the second drying furnace 172 or outside the second drying furnace 172. On the other hand, in a case where the glass transition temperature Tg of the resin contained in the pretreatment liquid is 65° C. or 85° C., it is found that the stop position of the coating end part of the pretreatment liquid may be any of in the first drying furnace 162, in the second drying furnace 172, or outside the second drying furnace 172.

Among experiments No. 19 to 27, experiments No. 22 to 24 have a common glass transition temperature Tg of a resin contained in the pretreatment liquid of 65° C. In experiments No. 22 to 24, the stop positions of the coating end part of the pretreatment liquid are in the first drying furnace 162, in the second drying furnace 172, and outside the second drying furnace 172, respectively.

In each of experiments No. 22 to 24, each evaluation item is determined to be B or more, and overall determination is A in all the experiments.

Among experiments No. 19 to 27, experiments No. 25 to 27 have a common glass transition temperature Tg of a resin contained in the pretreatment liquid of 85° C. In experiments No. 25 to 27, the stop positions of the coating end part of the pretreatment liquid are in the first drying furnace 162, in the second drying furnace 172, and outside the second drying furnace 172, respectively.

In each of experiments No. 25 to 27, each evaluation item is determined to be B or more, and overall determination is A in all the experiments.

As described above, in the printing conditions of experiments No. 22 to 27, in a case where the glass transition temperature Tg of the resin contained in the pretreatment liquid is any one of 45° C., 65° C., or 85° C., it is found that the stop position of the coating end part of the pretreatment liquid may be any of in the first drying furnace 162, in the second drying furnace 172, or outside the second drying furnace 172.

That is, it is preferable that the glass transition temperature Tg of the resin contained in the pretreatment liquid satisfies a relationship of the printing temperature of the first drying unit 160>Tg>the standby temperature of the first drying unit 160.

Experiments No. 28 to 36

Experiments No. 28 to 36 have the following common points. The coating amount of the pretreatment liquid is 3 gsm, the glass transition temperature Tg of a resin contained in the pretreatment liquid is 45° C., the tension of the substrate during pretreatment liquid coating is 70 N/m, the substrate temperature during pretreatment liquid drying is 80° C., the remaining water amount of the substrate after pretreatment liquid drying is 0.003 gsm, the printing temperature of the first drying unit 160 is 80° C., the standby temperature of the first drying unit 160 is 80° C., the printing temperature of the second drying unit 170 is 80° C., the standby temperature of the second drying unit 170 is 80° C., and the transport tension of the substrate during ink drying is 70 N/m.

Among experiments No. 28 to 36, experiments No. 28 to 30 have a common organic solvent amount of the pretreatment liquid of 1 percent by mass and have a common organic solvent remaining amount of the pretreatment liquid after ink drying of 0.1 gsm. In experiments No. 28 to 30, the stop positions of the coating end part of the pretreatment liquid are in the first drying furnace 162, in the second drying furnace 172, and outside the second drying furnace 172, respectively.

In experiment No. 28, since dirt on the pass rollers 102 of the first drying unit 160 and dirt on the pass rollers 102 of the second drying unit 170 are determined to be E, overall determination is D. In experiment No. 29, since dirt on the pass rollers 102 of the second drying unit 170 is determined to be E, overall determination is D. In experiment No. 30, each evaluation item is determined to be B or more, and overall determination is A.

Among experiments No. 28 to 36, experiments No. 31 to 33 have a common organic solvent amount of the pretreatment liquid of 3 percent by mass and have a common organic solvent remaining amount of the pretreatment liquid after ink drying of 0.3 gsm. In experiments No. 31 to 33, the stop positions of the coating end part of the pretreatment liquid are in the first drying furnace 162, in the second drying furnace 172, and outside the second drying furnace 172, respectively.

In experiment No. 31, since dirt on the pass rollers 102 of the first drying unit 160 and dirt on the pass rollers 102 of the second drying unit 170 are determined to be E, overall determination is D. In experiment No. 32, since dirt on the pass rollers 102 of the second drying unit 170 is determined to be E, overall determination is D. In experiment No. 33, image adhesiveness is determined to be C, and overall determination is C.

Among experiments No. 28 to 36, experiments No. 34 to 36 have a common organic solvent amount of the pretreatment liquid of 5 percent by mass and have a common organic solvent remaining amount of the pretreatment liquid after ink drying of 0.5 gsm. In experiments No. 34 to 36, the stop positions of the coating end part of the pretreatment liquid are in the first drying furnace 162, in the second drying furnace 172, and outside the second drying furnace 172, respectively.

In experiment No. 34, since dirt on the pass rollers 102 of the first drying unit 160 and dirt on the pass rollers 102 of the second drying unit 170 are determined to be E, overall determination is D. In experiment No. 35, since dirt on the pass rollers 102 of the second drying unit 170 is determined to be E, overall determination is D. In experiment No. 36, dirt on the pass rollers 102 of the first drying unit 160, dirt on the pass rollers 102 of the second drying unit 170, and image adhesiveness are determined to be C, and overall determination is C.

As described above, in the printing conditions of experiments No. 28 to 36, in any one of a case where the organic solvent amount of the pretreatment liquid is 1 percent by mass and the organic solvent remaining amount of the pretreatment liquid after ink drying is 0.1 gsm, a case where the organic solvent amount of the pretreatment liquid after ink drying is 3 percent by mass and the organic solvent remaining amount of the pretreatment liquid after ink drying is 0.3 gsm, or a case where the organic solvent amount of the pretreatment liquid is 5 percent by mass and the organic solvent remaining amount of the pretreatment liquid after is ink drying is 0.5 gsm, it is found that the stop position of the coating end part of the pretreatment liquid needs to be outside the second drying furnace 172.

That is, the content of the organic solvent in the pretreatment liquid is preferably less than 5 percent by mass with respect to the total mass of the pretreatment liquid, and it is more preferable that the pretreatment liquid does not contain the organic solvent.

Experiments No. 37 to 42

As shown in FIG. 13, experiments No. 37 to 42 have the following common points. The coating amount of the pretreatment liquid is 3 gsm, the glass transition temperature Tg of a resin contained in the pretreatment liquid is 45° C., the organic solvent amount of the pretreatment liquid is 0 percent by mass, the substrate temperature during pretreatment liquid drying is 80° C., the remaining water amount of the substrate after pretreatment liquid drying is 0.003 gsm, the printing temperature of the first drying unit 160 is 80° C., the standby temperature of the first drying unit 160 is 80° C., the printing temperature of the second drying unit 170 is 80° C., the standby temperature of the second drying unit 170 is 80° C., the transport tension of the substrate during ink drying is 70 N/m, the organic solvent remaining amount of the pretreatment liquid after ink drying is 0 gsm, and the stop position of the coating end part of the pretreatment liquid is outside the second drying furnace 172.

In addition, in experiments No. 37 to 42, the tension of the substrate during pretreatment liquid coating is 10 N/m, 20 N/m, 40 N/m, 150 N/m, 200 N/m, and 300 N/m, respectively.

In experiment No. 37, since dirt on the pass rollers 102 of the first drying unit 160 and dirt on the pass rollers 102 of the second drying unit 170 are determined to be D, overall determination is D. In experiment No. 38, since dirt on the pass rollers 102 of the first drying unit 160 and dirt on the pass rollers 102 of the second drying unit 170 are determined to be C, overall determination is C. In experiments No. 39 to 41, each evaluation item is determined to be B or more, and overall determination is A. In experiment No. 42, since the waste length is determined to be D, overall determination is D.

As described above, in the printing conditions of experiments No. 37 to 42, in a case where the tension of the substrate during pretreatment liquid coating is 20 N/m, 40 N/m, 150 N/m, or 200 N/m, there is no problem with dirt on the pass rollers 102 of the first drying unit 160 and dirt on the pass rollers 102 of the second drying unit 170, and it is found that the tension is appropriate. On the other hand, in a case where the tension of the substrate during pretreatment liquid coating is 10 N/m, it is found that dirt on the pass rollers 102 of the first drying unit 160 and dirt on the pass rollers 102 of the second drying unit 170 are unacceptable. In addition, in a case where the tension of the substrate during pretreatment liquid coating is 300 N/m, it is found that the waste length is unacceptable.

That is, the tension of the substrate during pretreatment liquid coating is preferably 20 N/m or more and 200 N/m or less and more preferably 40 N/m or more and 200 N/m or less.

Experiments No. 43 to 48

Experiments No. 43 to 48 have the following common points. The coating amount of the pretreatment liquid is 3 gsm, the glass transition temperature Tg of the resin contained in the pretreatment liquid is 45° C., the organic solvent amount of the pretreatment liquid is 0 percent by mass, the tension of the substrate during pretreatment liquid coating is 70 N/m, the substrate temperature during pretreatment liquid drying is 80° C., the remaining water amount of the substrate after pretreatment liquid drying is 0.003 gsm, the printing temperature of the first drying unit 160 is 80° C., the standby temperature of the first drying unit 160 is 80° C., the printing temperature of the second drying unit 170 is 80° C., the standby temperature of the second drying unit 170 is 80° C., the organic solvent remaining amount of the pretreatment liquid after ink drying is 0 gsm, and the stop position of the coating end part of the pretreatment liquid is outside the second drying furnace 172.

In addition, in experiments No. 43 to 48, the transport tension of the substrate during ink drying is 10 N/m, 20 N/m, 50 N/m, 100 N/m, 150 N/m, and 200 N/m, respectively.

In experiment No. 43, since the waste length is determined to be D, overall determination is D. In experiments No. 44 to 46, each evaluation item is determined to be B or more, and overall determination is A. In experiment No. 47, since dirt on the pass rollers 102 of the first drying unit 160 and dirt on the pass rollers 102 of the second drying unit 170 are determined to be C, overall determination is C. In experiment No. 48, since dirt on the pass rollers 102 of the first drying unit 160 and dirt on the pass rollers 102 of the second drying unit 170 are determined to be D, overall determination is D.

As described above, in the printing conditions of experiments No. 43 to 48, in a case where the tension of the substrate during ink drying is 20 N/m, 50 N/m, 100 N/m, or 150 N/m, there is no problem with dirt on the pass rollers 102 of the first drying unit 160 and dirt on the pass rollers 102 of the second drying unit 170, and it is found that the tension is appropriate. On the other hand, in a case where the tension of the substrate during ink drying is 200 N/m, it is found that dirt on the pass rollers 102 of the first drying unit 160 and dirt on the pass rollers 102 of the second drying unit 170 are unacceptable. In addition, in a case where the tension of the substrate during ink drying is 10 N/m, it is found that the waste length is unacceptable.

That is, the tension of the substrate during ink drying is preferably 20 N/m or more and 150 N/m or less and more preferably 20 N/m or more and 100 N/m or less.

Experiments No. 49 to 55

Experiments No. 49 to 55 have the following common points. The glass transition temperature Tg of the resin contained in the pretreatment liquid is 45° C., the organic solvent amount of the pretreatment liquid is 0 percent by mass, the tension of the substrate during pretreatment liquid coating is 70 N/m, the substrate temperature during pretreatment liquid drying is 80° C., the remaining water amount of the substrate after pretreatment liquid drying is 0.003 gsm, the printing temperature of the first drying unit 160 is 80° C., the standby temperature of the first drying unit 160 is 80° C., the printing temperature of the second drying unit 170 is 80° C., the standby temperature of the second drying unit 170 is 80° C., the transport tension of the substrate during ink drying is 70 N/m, the organic solvent remaining amount of the pretreatment liquid after ink drying is 0 gsm, and the stop position of the coating end part of the pretreatment liquid is outside the second drying furnace 172.

In addition, in experiments No. 49 to 55, the coating amounts of the pretreatment liquid are 0.1 gsm, 0.5 gsm, 1 gsm, 5 gsm, 8 gsm, 10 gsm, and 12 gsm, respectively.

In experiment No. 49, since image adhesiveness is determined to be D, overall determination is D. In experiments No. 50 to 53, each evaluation item is determined to be B or more, and overall determination is A. In experiment No. 54, dirt on the pass rollers 102 of the first drying unit 160, dirt on the pass rollers 102 of the second drying unit 170, and image adhesiveness are determined to be C, and overall determination is C. In experiment No. 55, dirt on the pass rollers 102 of the first drying unit 160, dirt on the pass rollers 102 of the second drying unit 170, and image adhesiveness are determined to be D, and overall determination is D.

As described above, in the printing conditions of experiments No. 49 to 55, in a case where the coating amount of the pretreatment liquid is 0.5 gsm, 1 gsm, 5 gsm, 8 gsm, or 10 gsm, there is no problem with dirt on the pass rollers 102 of the first drying unit 160 and dirt on the pass rollers 102 of the second drying unit 170, and it is found that the coating amount is appropriate. On the other hand, in a case where the coating amount of the pretreatment liquid is 12 gsm, it is found that dirt on the pass rollers 102 of the first drying unit 160, dirt on the pass rollers 102 of the second drying unit 170, and image adhesiveness are unacceptable. In addition, in a case where the coating amount of the pretreatment liquid is 0.1 gsm, it is found that image adhesiveness is unacceptable.

That is, the coating amount of the pretreatment liquid is preferably 0.5 gsm or more and 10 gsm or less and more preferably 0.5 gsm or more and 8 gsm or less.

Experiments No. 56 to 61

Experiments No. 56 to 61 have the following common points. The coating amount of the pretreatment liquid is 3 gsm, the glass transition temperature Tg of a resin contained in the pretreatment liquid is 45° C., the organic solvent amount of the pretreatment liquid is 0 percent by mass, the tension of the substrate during pretreatment liquid coating is 70 N/m, the remaining water amount of the substrate after pretreatment liquid drying is 0.003 gsm, the printing temperature of the first drying unit 160 is 80° C., the standby temperature of the first drying unit 160 is 80° C., the printing temperature of the second drying unit 170 is 80° C., the standby temperature of the second drying unit 170 is 80° C., the transport tension of the substrate during ink drying is 70 N/m, the organic solvent remaining amount of the pretreatment liquid after ink drying is 0 gsm, and the stop position of the coating end part of the pretreatment liquid is outside the second drying furnace 172.

In addition, in experiments No. 56 to 61, the substrate temperatures during pretreatment liquid drying are 25° C., 30° C., 40° C., 60° C., 90° C., and 100° C., respectively.

In experiment No. 56, dirt on the pass rollers 102 of the first drying unit 160, dirt on the pass rollers 102 of the second drying unit 170, and image adhesiveness are determined to be D, and overall determination is D. In experiment No. 57, dirt on the pass rollers 102 of the first drying unit 160, dirt on the pass rollers 102 of the second drying unit 170, and image adhesiveness are determined to be C, and overall determination is C. In experiments No. 58 and 59, each evaluation item is determined to be B or more, and overall determination is A. In experiment No. 60, the waste length is determined to be C, and overall determination is C. In experiment No. 61, since the waste length is determined to be D, overall determination is D.

As described above, in the printing conditions of experiments No. 56 to 61, in a case where the substrate temperatures during pretreatment liquid drying are 30° C., 40° C., 60° C., and 90° C., respectively, there is no problem with dirt on the pass rollers 102 of the first drying unit 160 and dirt on the pass rollers 102 of the second drying unit 170, and it is found that the temperature is appropriate. On the other hand, in a case where the substrate temperature during pretreatment liquid drying is 25° C., it is found that dirt on the pass rollers 102 of the first drying unit 160, dirt on the pass rollers 102 of the second drying unit 170, and image adhesiveness are unacceptable. In addition, it is found that in a case where the substrate temperature during pretreatment liquid drying is 100° C., the waste length is unacceptable.

That is, the substrate temperature during pretreatment liquid drying is preferably 30° C. or more and 90° C. or less and more preferably 40° C. or more and 60° C. or less.

Experiments No. 62 to 66

Experiments No. 62 to 66 have the following common points. The coating amount of the pretreatment liquid is 3 gsm, the glass transition temperature Tg of a resin contained in the pretreatment liquid is 45° C., the organic solvent amount of the pretreatment liquid is 0 percent by mass, the tension of the substrate during pretreatment liquid coating is 70 N/m, the substrate temperature during pretreatment liquid drying is 80° C., the printing temperature of the first drying unit 160 is 80° C., the standby temperature of the first drying unit 160 is 80° C., the printing temperature of the second drying unit 170 is 80° C., the standby temperature of the second drying unit 170 is 80° C., the transport tension of the substrate during ink drying is 70 N/m, the organic solvent remaining amount of the pretreatment liquid after ink drying is 0 gsm, and the stop position of the coating end part of the pretreatment liquid is outside the second drying furnace 172.

In addition, in experiments No. 62 to 66, the remaining water amounts of the substrate after pretreatment liquid drying are 0.005 gsm, 0.01 gsm, 0.05 gsm, 0.1 gsm, and 0.12 gsm, respectively.

In experiments No. 62 to 64, each evaluation item is determined to be B or more, and overall determination is A. In experiment No. 65, dirt on the pass rollers 102 of the first drying unit 160, dirt on the pass rollers 102 of the second drying unit 170, and image adhesiveness are determined to be C, and overall determination is C. In experiment No. 66, dirt on the pass rollers 102 of the first drying unit 160, dirt on the pass rollers 102 of the second drying unit 170, and image adhesiveness are determined to be D, and overall determination is D.

As described above, in the printing conditions of experiments No. 62 to 66, in a case where the remaining water amount of the substrate after pretreatment liquid drying is 0.005 gsm, 0.01 gsm, 0.05 gsm, or 0.1 gsm, it is found that there is no problem with dirt on the pass rollers 102 of the first drying unit 160 and dirt on the pass rollers 102 of the second drying unit 170, and the remaining water amount is appropriate. On the other hand, in a case where the remaining water amount of the substrate after pretreatment liquid drying is 0.12 gsm, it is found that dirt on the pass rollers 102 of the first drying unit 160, dirt on the pass rollers 102 of the second drying unit 170, and image adhesiveness are unacceptable.

That is, the remaining water amount of the substrate after pretreatment liquid drying is preferably 0.1 gsm or less and more preferably 0.05 gsm or less.

Experiments No. 67 to 69

Experiments 67 to 69 have the following common points. The coating amount of the pretreatment liquid is 3 gsm, the glass transition temperature Tg of a resin contained in the pretreatment liquid is 65° C., the organic solvent amount of the pretreatment liquid is 3 percent by mass, the tension of the substrate during pretreatment liquid coating is 70 N/m, the substrate temperature during pretreatment liquid drying is 80° C., the remaining water amount of the substrate after pretreatment liquid drying is 0.003 gsm, the printing temperature of the first drying unit 160 is 80° C., the standby temperature of the first drying unit 160 is 80° C., the printing temperature of the second drying unit 170 is 60° C., the standby temperature of the second drying unit 170 is 60° C., the transport tension of the substrate during ink drying is 70 N/m, and the stop position of the coating end part of the pretreatment liquid is in the second drying furnace 172.

In addition, in experiments No. 67 to 69, the organic solvent remaining amounts of the pretreatment liquid after ink drying are 0.2 gsm, 0.5 gsm, and 0.7 gsm, respectively. FIG. 13 shows experiment No. 14 together with experiments No. 67 to 69 for comparison. In experiment No. 14, the organic solvent amount of the pretreatment liquid is 0 percent by mass, the organic solvent remaining amount of the pretreatment liquid after ink drying is 0 gsm, and other printing conditions are the same as those of experiments No. 67 to 69.

In experiment No. 67, each evaluation item is determined to be B or more, and overall determination is A. In experiment No. 68, dirt on the pass rollers 102 of the first drying unit 160, dirt on the pass rollers 102 of the second drying unit 170, and image adhesiveness are determined to be C, and overall determination is C. In experiment No. 69, dirt on the pass rollers 102 of the first drying unit 160, dirt on the pass rollers 102 of the second drying unit 170, and image adhesiveness are determined to be D, and overall determination is D.

As described above, in the printing conditions of experiments No. 67 to 69, in a case where the organic solvent remaining amounts of the pretreatment liquid after ink drying are 0.2 gsm and 0.5 gsm respectively, it is found that there is no problem with dirt on the pass rollers 102 of the first drying unit 160 and dirt on the pass rollers 102 of the second drying unit 170, and the organic solvent remaining amount is appropriate. On the other hand, in a case where the organic solvent remaining amount of the pretreatment liquid after ink drying is 0.7 gsm, it is found that dirt on the pass rollers 102 of the first drying unit 160, dirt on the pass rollers 102 of the second drying unit 170, and image adhesiveness are unacceptable.

That is, the organic solvent remaining amount of the pretreatment liquid after ink drying is preferably 0.5 gsm or less and more preferably 0.2 gsm or less.

<Substrate Shape Correction Mechanism>

Configuration of Printing Unit

Figure 14:
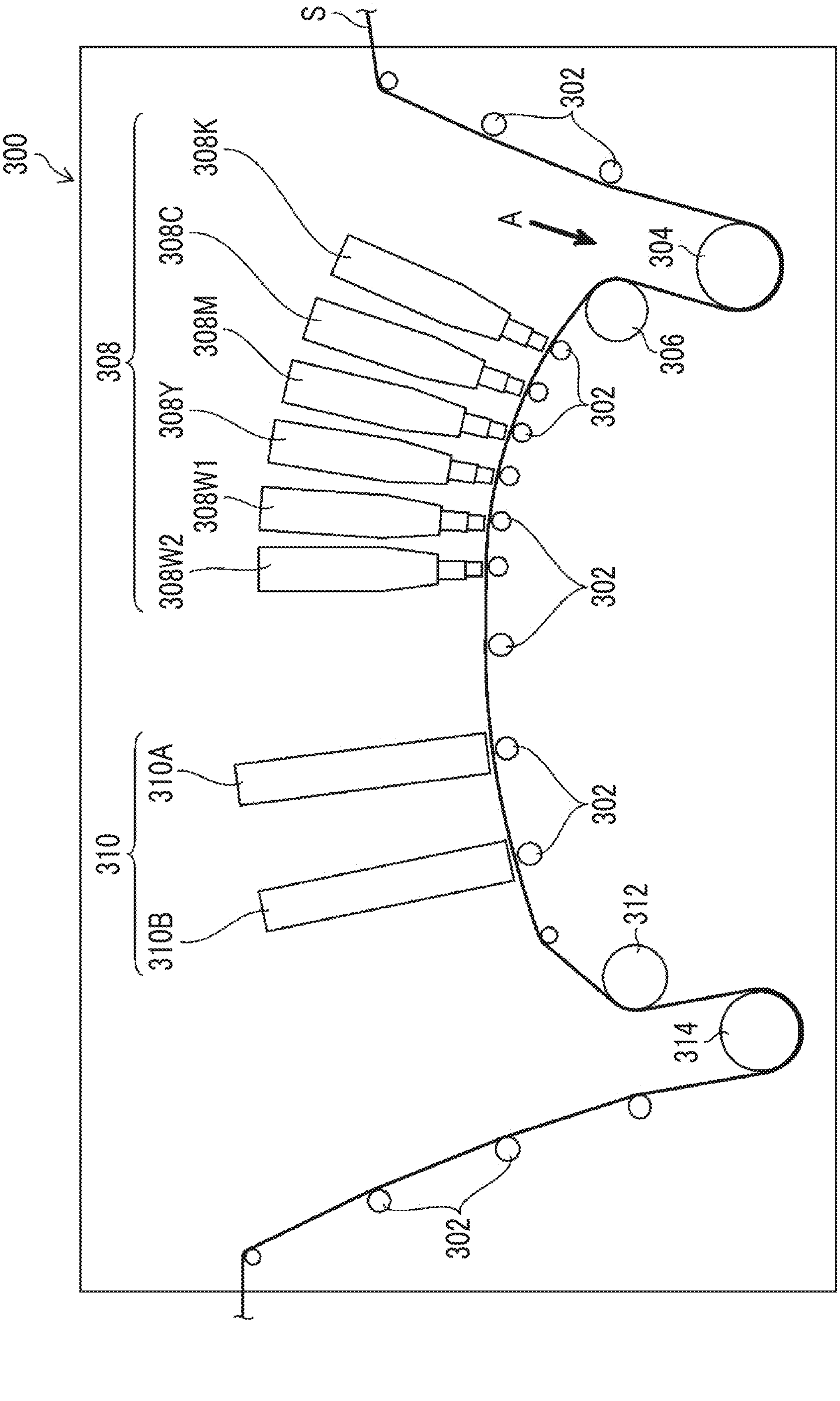
FIG. 14 is a configuration view of a printing unit according to a modification example.

FIG. 14 is a configuration view of a printing unit 300 according to a modification example. The printing unit 300 applies an ink to the printing surface of the substrate S to print an image. The printing unit 300 comprises a plurality of pass rollers 302, a first air turn bar 304, a third suction drum 306, an ink jet unit 308, a scanner unit 310, a fourth suction drum 312, and a second air turn bar 314.

The substrate S transported to the printing unit 300 from the previous step is guided to the pass rollers 302 and is transported to the first air turn bar 304. The first air turn bar 304 is disposed on the upstream side of the third suction drum 306 in the transport path.

The first air turn bar 304 changes the orientation of the transport path from downward to upward without coming into contact with the printing surface of the substrate S. The configuration and the action of the first air turn bar 304 are the same as those of the non-contact turn unit 150.

The substrate S of which the traveling direction is changed by the first air turn bar 304 is transported to the third suction drum 306. The third suction drum 306 is disposed on the upstream side of the ink jet unit 308 and the scanner unit 310 in the transport path so that an axis (not shown) thereof is orthogonal to the transport direction of the substrate S. The third suction drum 306 is rotated about the axis by a motor (not shown) and transports the substrate S by adsorbing the substrate S on an outer peripheral surface thereof. The configuration and the action of the third suction drum 306 are the same as those of the first suction drum 142.

The substrate S transported by the third suction drum 306 is guided by the pass rollers 302 and is transported to the fourth suction drum 312.

The fourth suction drum 312 is disposed on the downstream side of the ink jet unit 308 and the scanner unit 310 in the transport path. The fourth suction drum 312 is rotated by a motor (not shown) and transports the substrate S by adsorbing the substrate S on an outer peripheral surface thereof. The configuration and the action of the fourth suction drum 312 are the same as those of the first suction drum 142.

The ink jet unit 308 and the scanner unit 310 are disposed in the transport path between the third suction drum 306 and the fourth suction drum 312.

The ink jet unit 308 is disposed at a position facing the substrate S to be transported. The ink jet unit 308 coats the printing surface of the substrate S with an aqueous color ink to print a color image. The ink jet unit 308 comprises print bars 308K, 308C, 308M, and 308Y. In addition, the ink jet unit 308 comprises print bars 308W1 and 308W2 on the downstream side of the print bars 308K, 308C, 308M, and 308Y in the transport path.

The configurations and actions of the print bars 308K, 308C, 308M, 308Y, 308W1, and 308W2 are the same as those of the ink jet heads 146K, 146C, 146M, 146Y, 146W1, and 146W2.

The substrate S transported to the printing unit 300 is transported to a position facing the print bars 308K, 308C, 308M, and 308Y. Liquid droplets of an aqueous ink are jetted from at least one of the print bars 308K, 308C, 308M, or 308Y toward the printing surface of the substrate S, and the jetted liquid droplets adhere to the substrate S, so that an image is printed on the printing surface of the substrate S.

The substrate S on which a color image is printed by the print bars 308K, 308C, 308M, and 308Y is guided by the pass rollers 302 and is transported to a position facing the print bars 308W1 and 308W2. Liquid droplets of an aqueous white ink are jetted from at least one of the print bar 308W1 or 308W2 toward the printing surface of the substrate S, and the jetted liquid droplets adhere to the substrate S, so that a white background image is printed on the printing surface of the substrate S.

The substrate S on which a white background image is printed by the print bars 308W1 and 308W2 is guided by the pass rollers 302 and is transported to a position facing the scanner unit 310.

The scanner unit 310 is disposed on the downstream side of the ink jet unit 308 in the transport path and at a position facing the printing surface of the substrate S to be transported. The scanner unit 310 examines a test pattern image such as a nozzle check pattern printed on the substrate S by the print bars 308K, 308C, 308M, 308Y, 308W1, and 308W2.

The scanner unit 310 comprises a fourth scanner 310A and a fifth scanner 310B. The configurations and actions of the fourth scanner 310A and the fifth scanner 310B are the same as those of the first scanner 148A and the second scanner 148B.

Each of the fourth scanner 310A and the fifth scanner 310B reads a test pattern image printed on the printing surface of the substrate S from the printing surface side.

The substrate S on which a test pattern image has been examined by the fourth scanner 310A and the fifth scanner 310B is guided downward by the fourth suction drum 312 and is transported to the second air turn bar 314.

The second air turn bar 314 is disposed on the downstream side of the fourth suction drum 312 in the transport path. The configuration and the action of the second air turn bar 314 are the same as those of the non-contact turn unit 150. The second air turn bar 314 changes the orientation of the transport path from downward to upward without coming into contact with the printing surface of the substrate S.

The substrate S of which the traveling direction is changed by the second air turn bar 314 is guided by the pass rollers 302 and is transported to the subsequent step.

As described above, in order to improve printing accuracy, the printing unit 300 is configured such that the ink jet unit 308 is interposed between the third suction drum 306 and the fourth suction drum 312 that adsorb and transport the substrate S so as not to receive effects of previous and subsequent steps. In addition, in order to make the size of the device small, the first air turn bar 304 and the second air turn bar 314 are installed at the front and the back of the transport path, and the substrate S is transported while being floated.

[Generation of Bending Creases]

The printing unit 300 may have a defect in which in a case where adsorption transport by the third suction drum 306 is performed, bending creases are generated in the substrate S immediately below the ink jet unit 308, the print bar 308K or the like cannot be brought close to the substrate S to a desired height, and printing cannot be performed.

Figure 15B:
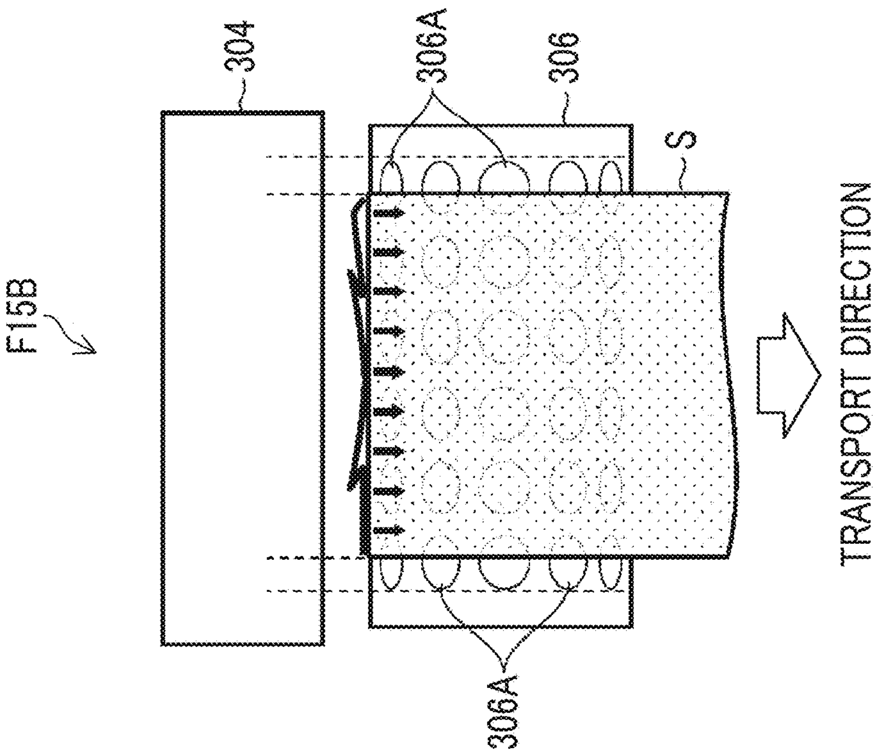
FIGS. 15A and 15B are views for describing an estimation mechanism of generation of bending creases in a substrate.
Figure 15A:
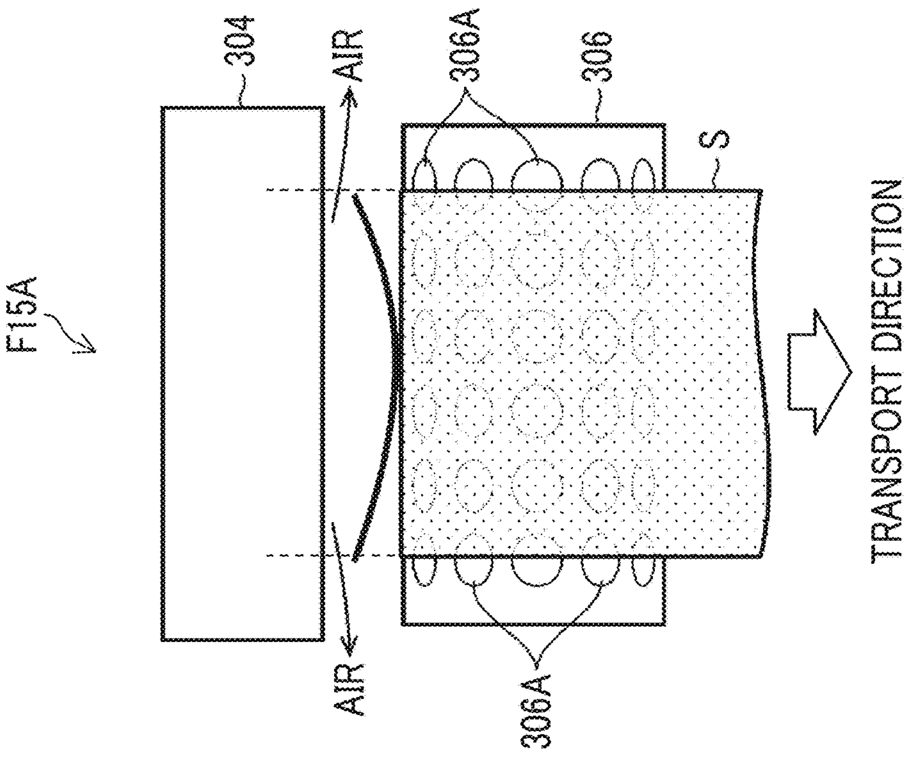

FIGS. 15A and 15B are views for describing an estimation mechanism of generation of bending creases in the substrate S and are A arrow views of FIG. 14. Since air blown from the first air turn bar 304 escapes from the width direction orthogonal to the transport direction of the substrate S (see F15A), the substrate S floated by the first air turn bar 304 is likely to have a crown shape. Since the substrate S is adsorbed by an adsorption hole 306A of the third suction drum 306 in this state, it is estimated that the substrate S that is not completely spread has bending creases (see F15B).

Thus, in order to transport the substrate S without bending creases, a substrate shape correction mechanism is installed in a printing unit 300 between the first air turn bar 304 and the third suction drum 306 in the transport path of the substrate S. The substrate shape correction mechanism corrects the shape of the substrate S at the time of entering the third suction drum 306 and suppresses generation of bending creases.

Figure 16:
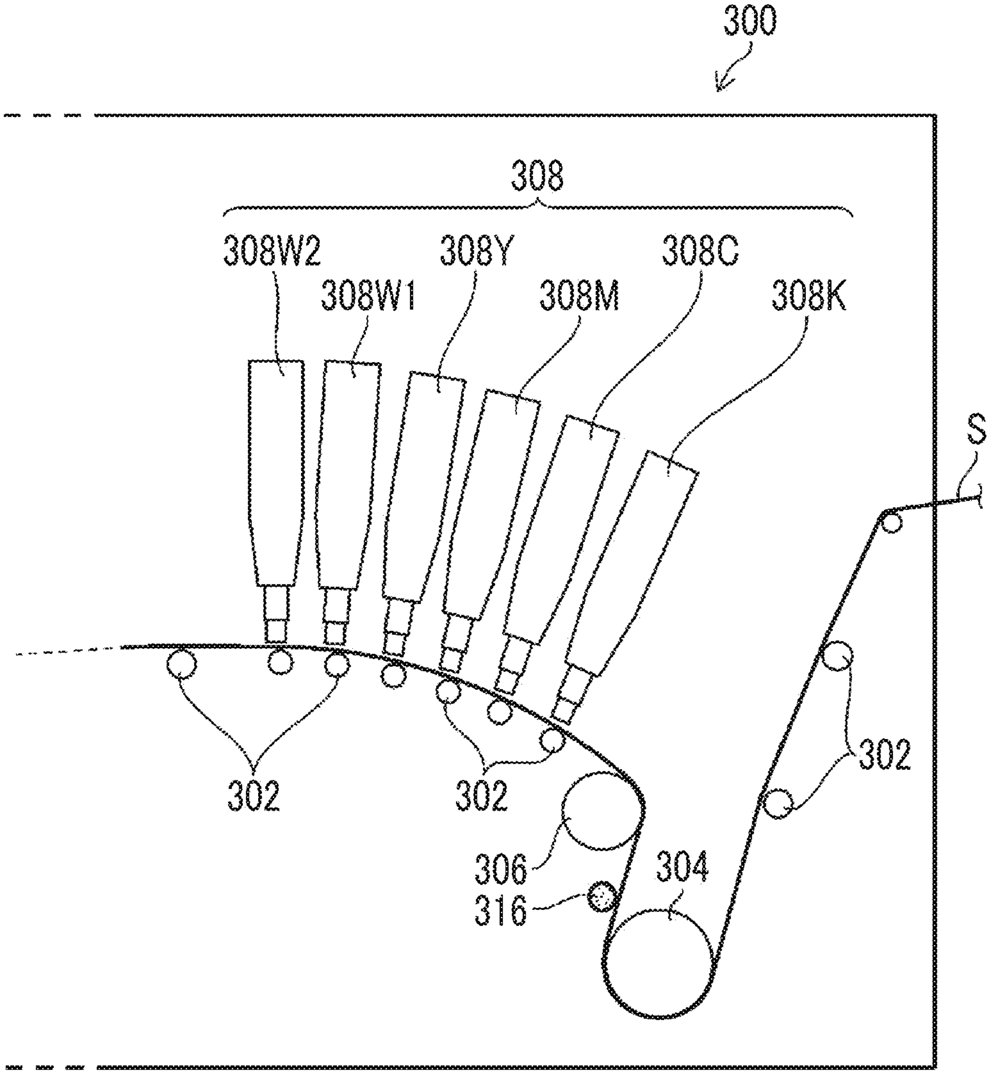
FIG. 16 is a view showing an example of a printing unit in which a substrate shape correction mechanism is disposed.

FIG. 16 is a view showing an example of the printing unit 300 on which the substrate shape correction mechanism is installed. Herein, as the substrate shape correction mechanism, a pass roller 316 is disposed between the first air turn bar 304 and the third suction drum 306 in the transport path of the substrate S. That is, the pass roller 316 is disposed such that an axis (not shown) thereof is orthogonal to the transport direction of the substrate S after the floating transport by the first air turn bar 304 and before adsorption transport by the third suction drum 306 in the transport path of the substrate S.

As the pass roller 316 comes into contact with the back surface of the substrate S and rotates about the axis, the substrate S having a crown shape due to the first air turn bar 304 is corrected into a flat state, and the substrate S is delivered to the third suction drum 306.

At least a surface that comes into contact with the substrate S of the pass roller 316 is composed of a low friction member. The low friction member is, for example, a member having a friction coefficient of 0.2 or more and 0.6 or less.

The pass roller 316 may comprise a position adjustment mechanism (not shown) capable of adjusting a mounting position of the pass roller 316. The printing unit 300 may comprise a shape measuring device (not shown) that measures the shape of the substrate S, and the position adjustment mechanism may adjust the mounting position of the pass roller 316 according to a measurement result of the shape of the substrate S.

Herein, although the pass roller 316 has been described as an example of the substrate shape correction mechanism, the substrate shape correction mechanism may be a round bar member having a columnar shape disposed to be orthogonal to the transport direction of the substrate S. The round bar member may come into sliding contact with the back surface of the printing surface of the substrate S.

Figure 17:
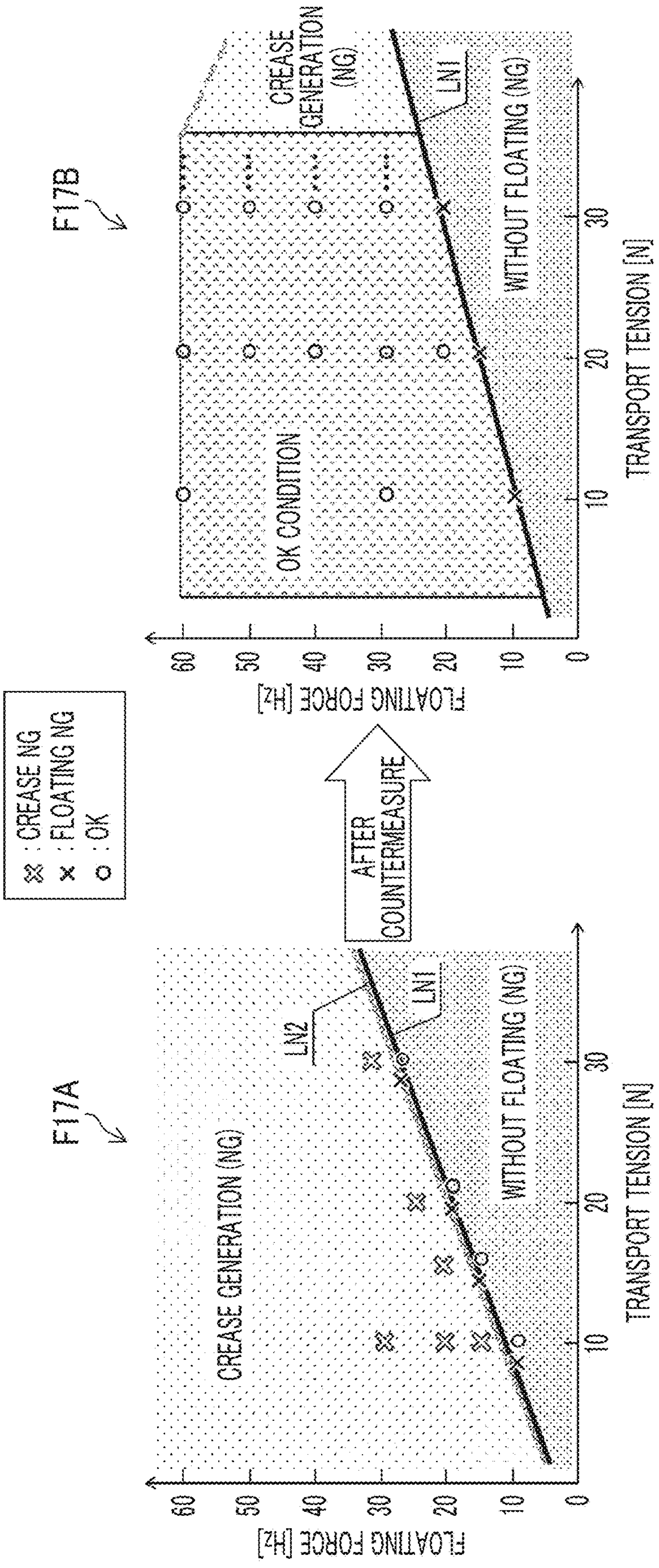
FIG. 17 is a graph for describing an effect of installing a pass roller.

FIG. 17 is a graph for describing an effect of installing the pass roller 316. F17A of FIG. 17 is a graph in which a relationship between the transport tension [unit: newton] of the substrate S and the floating force [unit: hertz] of the substrate S in a case where the pass roller 316 is not disposed is plotted. The floating force is represented by a driving frequency of a fan (not shown) for blowing air from the first air turn bar 304.

In F17A, a plotted point indicated by a cross mark (x) is a condition in which the substrate S does not float, and a region below a boundary line LN1 estimated from a plotted position of the cross mark is a condition in which the substrate S does not float due to an insufficient floating force.

In F17A, a plotted point indicated by a white x mark (x) is a condition in which creases are generated in the substrate S, and a region above a boundary line LN2 estimated from a plotted position of the white x mark is a condition in which creases are generated in the substrate S due to a large amount of air escaping from the width direction of the substrate S.

In F17A, a plotted point indicated by a circle mark (○) is a condition for passing the test in which the substrate S floats and creases are not generated. As described above, in order to float the substrate S without generating creases, it is necessary to transport the substrate S under limited conditions, and in a case where conditions of the transport tension or the floating force change depending on the environment, the substrate S cannot be appropriately transported in some cases.

F17B of FIG. 17 is a graph in which a relationship between the transport tension [unit: newton] of the substrate S and the floating force [unit: hertz] of the substrate S in a case where the pass roller 316 is disposed is plotted.

As shown in F17B, in a case where the pass roller 316 is disposed, it is confirmed that the generation of bending creases is suppressed even in a case where the floating force is relatively high, and the substrate S can be appropriately transported.

As described above, with the substrate shape correction mechanism, the transport of the substrate S can be stabilized. That is, scratches on the substrate S can be reduced and the amount of meandering can be reduced. In addition, with the substrate shape correction mechanism, the generation of creases can be suppressed and the quality of a printed material can be stabilized.

Others

The technical scope of the present invention is not limited to the scope described in the embodiments. The configuration and the like in each embodiment can be combined between the embodiments as appropriate without departing from the gist of the present invention.

EXPLANATION OF REFERENCES

10: ink jet printing device
20: bar block
22: bar coater
22A: central axis
24: bar support portion
26: member
26A: bar facing surface
30: upstream weir
32: downstream weir
34: liquid pool
34A: bottom surface
36: slit
38: collection groove
40: base
50: pretreatment liquid supply device
52: supply flow passage
54: liquid feeding pump
56: pretreatment liquid tank
57: circulation flow passage
58: circulation pump
59: collection tank
60: transport mechanism
62: first lift roller
64: second lift roller
68: raising and lowering device
70: wire bar coater
72: core material
74: wire
75A: concave portion
75B: non-concave portion
76: wire column
80: wireless bar coater
82: core material
84: groove
84A: bottom surface
86: non-groove portion
86A: upper surface
100: transport unit
102: pass roller
110: sending unit
112: sending roll
114: first drive roller
116: second drive roller
118: corona treatment unit
120: winding unit
122: winding roll
130: pretreatment unit
132: pretreatment liquid coating device
134: third drive roller
136: pretreatment liquid drying device
138: heater
140: printing unit
142: first suction drum
144: second suction drum
146: ink jet unit
146C: ink jet head
146K: ink jet head
146M: ink jet head
146W1: ink jet head
146W2: ink jet head
146Y: ink jet head
148: scanner unit
148A: first scanner
148B: second scanner
150: non-contact turn unit
160: first drying unit
162: first drying furnace
164: first hot air heater
166: roller
168: first camera
170: second drying unit
172: second drying furnace
174: second hot air heater
176: roller
178: second camera
180: examination unit
182: third scanner
184: fourth drive roller
186: fifth drive roller
200: processor
202: communication device
204: input device
206: display device
208: memory
300: printing unit
302: pass roller
304: first air turn bar
306: third suction drum
308: ink jet unit
308C: print bar
308K: print bar
308M: print bar
308Y: print bar
308W1: print bar
308W2: print bar
310: scanner unit
310A: fourth scanner
310B: fifth scanner
312: fourth suction drum
314: second air turn bar
316: pass roller (substrate shape correction mechanism)
LN1: boundary line
LN2: boundary line
S: substrate
S1 to S13: steps of control method of ink jet printing device

What is claimed is:

1. A printing device comprising:

a transport device that transports a long substrate along a transport path and that winds the substrate with a winding device;

an ink applying device that is disposed in the transport path and that applies an ink to a printing surface of the substrate;

a pretreatment liquid applying device that is disposed on an upstream side of the ink applying device in the transport path and that applies a pretreatment liquid to the printing surface of the substrate;

a first drying device that is disposed on a downstream side of the ink applying device in the transport path and that dries the ink applied to the printing surface of the substrate;

a second drying device that is disposed on the downstream side of the first drying device in the transport path; and at least one processor, wherein the processor is configured to:

stop transport of the substrate once an end part that is an end of a region of the printing surface of the substrate, to which the pretreatment liquid is applied, reaches between the first drying device and the winding device, in a case of stopping the transport of the substrate; and set the first drying device to a first temperature and set the second drying device to a second temperature lower than the first temperature, wherein the pretreatment liquid contains a resin of which a softening temperature is Ts, and the Ts satisfies a relationship of the first temperature>the Ts>the second temperature.

2. The printing device according to claim 1, wherein the first drying device includes a pass roller that comes into contact with the printing surface of the substrate.

3. The printing device according to claim 1, wherein the pretreatment liquid contains an organic solvent, and a content of the organic solvent is less than 5 percent by mass with respect to a total mass of the pretreatment liquid.

4. The printing device according to claim 3, wherein the first drying device performs drying until an organic solvent remaining amount of a surface of the substrate becomes 0.5 gsm or less.

5. The printing device according to claim 1, wherein the pretreatment liquid does not contain an organic solvent.

6. The printing device according to claim 1, wherein the pretreatment liquid applying device applies 0.5 gsm or more and 10 gsm or less of the pretreatment liquid to the substrate.

7. The printing device according to claim 1, wherein the pretreatment liquid applying device includes a pretreatment liquid drying device that dries the pretreatment liquid applied to the substrate, and the pretreatment liquid drying device performs drying until a remaining water amount of a surface of the substrate becomes 0.1 gsm or less.

8. The printing device according to claim 1, wherein the pretreatment liquid applying device includes a pretreatment liquid drying device that dries the pretreatment liquid applied to the substrate, and the pretreatment liquid drying device makes a temperature of the substrate 30° C. or more and 90° C. or less.

9. The printing device according to claim 1, wherein the transport device transports the substrate by applying tension of 20 newtons or more and 200 newtons or less per meter to the substrate in a case of applying the pretreatment liquid.

10. The printing device according to claim 1, wherein the transport device transports the substrate by applying tension of 20 newtons or more and 150 newtons or less per meter to the substrate in a case of drying the ink.

11. The printing device according to claim 1, further comprising:

an imaging device that is disposed between the first drying device and the winding device in the transport path and that images the printing surface of the substrate, wherein the processor is configured to:

detect that the end part has reached between the first drying device and the winding device from an image of the printing surface, which is captured by the imaging device.

12. A printing device comprising:

a transport device that transports a long substrate along a transport path and that winds the substrate with a winding device;

an ink applying device that is disposed in the transport path and that applies an ink to a printing surface of the substrate;

a pretreatment liquid applying device that is disposed on an upstream side of the ink applying device in the transport path and that applies a pretreatment liquid to the printing surface of the substrate, wherein the pretreatment liquid contains a resin of which a softening temperature is Ts;

a first drying device that is disposed on a downstream side of the ink applying device in the transport path and that dries the ink applied to the printing surface of the substrate; and at least one processor, wherein the processor is configured to:

stop transport of the substrate once an end part that is an end of a region of the printing surface of the substrate, to which the pretreatment liquid is applied, reaches between the first drying device and the winding device, in a case of stopping the transport of the substrate;

set the first drying device to a first temperature in a printing mode in which the substrate is transported and set the first drying device to a third temperature in a printing standby mode in which the transport of the substrate is stopped, and the Ts satisfies a relationship of the first temperature>the Ts>the third temperature.

13. The printing device according to claim 12, wherein the processor is configured to:

cause the first drying device to transition to the printing standby mode after printing ends and stop the first drying device after a certain time has elapsed from the transition to the printing standby mode.

14. A control method of a printing device including a transport device that transports a long substrate along a transport path and that winds the substrate with a winding device, an ink applying device that is disposed in the transport path and that applies an ink to a printing surface of the substrate, a pretreatment liquid applying device that is disposed on an upstream side of the ink applying device in the transport path and that applies a pretreatment liquid to the printing surface of the substrate, and a first drying device that is disposed on a downstream side of the ink applying device in the transport path, that has a pass roller coming into contact with the printing surface of the substrate, and that dries the ink applied to the printing surface of the substrate, a second drying device that is disposed on the downstream side of the first drying device in the transport path, the control method comprising:

stopping transport of the substrate once an end part that is an end of a region of the printing surface of the substrate, to which the pretreatment liquid is applied, reaches between the first drying device and the winding device, in a case of stopping the transport of the substrate, setting the first drying device to a first temperature and set the second drying device to a second temperature lower than the first temperature, wherein the pretreatment liquid contains a resin of which a softening temperature is Ts, and the Ts satisfies a relationship of the first temperature>the Ts>the second temperature.

* * * * *